(12) United States Patent
Canpolat et al.

(10) Patent No.: US 12,395,896 B2
(45) Date of Patent: Aug. 19, 2025

(54) METHOD AND APPARATUS USED IN WLAN NETWORKS

(71) Applicant: Intel Corporation, Santa Clara, CA (US)

(72) Inventors: Necati Canpolat, Beaverton, OR (US); Dave Cavalcanti, Portland, OR (US); Cheng Chen, Portland, OR (US); Dibakar Das, Hilsboro, OR (US); Chittabrata Ghosh, Fremont, CA (US); Ganesh Venkatesan, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 967 days.

(21) Appl. No.: 17/133,654

(22) Filed: Dec. 24, 2020

(65) Prior Publication Data

US 2021/0120457 A1   Apr. 22, 2021

(51) Int. Cl.
*H04W 28/24* (2009.01)
*H04L 47/80* (2022.01)
*H04W 28/02* (2009.01)
*H04W 84/12* (2009.01)
*H04W 88/08* (2009.01)

(52) U.S. Cl.
CPC .......... *H04W 28/24* (2013.01); *H04L 47/805* (2013.01); *H04W 28/0268* (2013.01); *H04W 84/12* (2013.01); *H04W 88/08* (2013.01)

(58) Field of Classification Search
None
See application file for complete search history.

(56) References Cited

U.S. PATENT DOCUMENTS

2021/0282056 A1\* 9/2021 Smith ................. H04L 47/24

\* cited by examiner

*Primary Examiner* — Kouroush Mohebbi
(74) *Attorney, Agent, or Firm* — East IP P.C.

(57) ABSTRACT

The application provides a method, method, comprising: a station (STA) sending a first quality of service (QoS) request message to an access point (AP) indicating a requested QoS for a traffic stream from the AP to the STA; the AP receiving the first QoS request message from the STA and sending a first traffic stream applied with the requested QoS to the STA when the requested QoS matches with an existing QoS policy for the STA in the AP or there is no existing QoS policy for the STA in the AP, and the STA receiving the first traffic stream applied with the requested QoS from AP.

20 Claims, 15 Drawing Sheets

METHOD AND APPARATUS USED IN WLAN NETWORKS

TECHNICAL FIELD

Embodiments of the present disclosure generally relate to wireless communications in a wireless local area network (WLAN), and in particular, to a method and apparatus used in a WLAN.

BACKGROUND

An Extremely High Throughput (EHT) network, also known as 802.11be network, achieves high throughput through a series of system features and various mechanisms.

BRIEF DESCRIPTION OF THE DRAWINGS

Embodiments of the disclosure will be illustrated, by way of example and not limitation, in conjunction with the figures of the accompanying drawings in which like reference numerals refer to similar elements and wherein.

DETAILED DESCRIPTION

Figure 1:
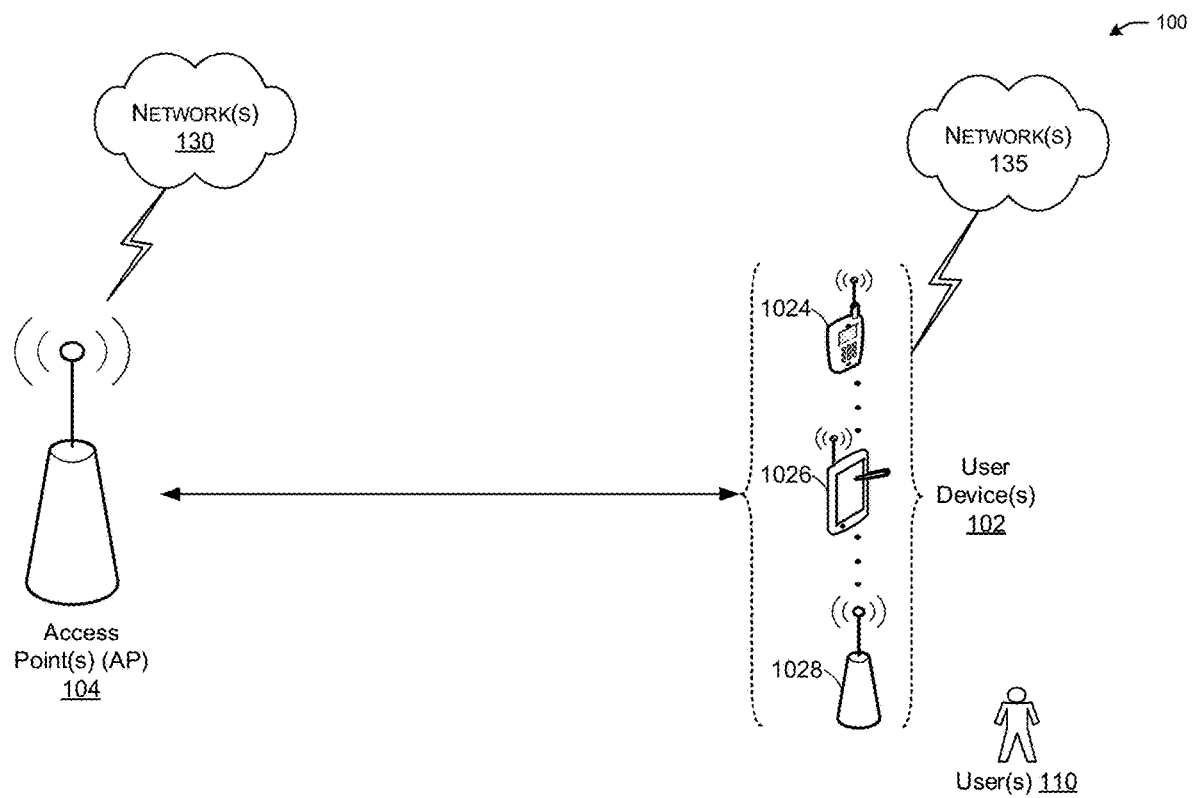
FIG. 1 is a network diagram illustrating an example network environment according to some example embodiments of the disclosure.

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

In the current Wi-Fi Multimedia (WMM) Access Controller (AC) based Quality of Service (QoS) implementations, station (STA), based on the application needs, initiates QoS establishment, which first fill out traffic specification (TSPEC) and optionally one or more traffic classifications (TCLAS) and send it with an ADD traffic stream (ADDTS) request indicating a requested QoS (for example, requested user priority (UP)) to access point (AP). After agreeing to STA's request, AP sends an ADDTS response, and treats the downlink traffic stream with the requested UP established for that traffic stream. When the application needs change at the STA, it sends another ADDTS request indicating an updated requested QoS (for example, an updated requested UP) to AP, and a new QoS (for example, a new UP) gets established after AP agreeing to the STA's request. When the session between STA and AP comes to an end, STA sends a DELETE traffic stream (DELTS) request to AP. It ca be seen that the above QoS establishment process is typical device centric based QoS establishment. However, in many cases, it is difficult for STA to know all the parameters needed to fill out the TSPEC/TCLAS for the requested traffic stream. Further, parameters corresponding to the QoS stream could change during the session due to change in server/IP address and flow characteristics etc.

Also, enterprises have certain applications such as cloud and voice etc., and they have network policies prioritizing them. However, there is no current standards based solution for network-centric QoS management.

An aspect of the disclosure provides a station (STA), comprising: a wireless medium; and processor circuitry coupled to the wireless medium and configured to: send a first quality of service (QoS) request message to an access point (AP) indicating a requested QoS for a traffic stream from the AP to the STA; and receive a first traffic stream applied with the requested QoS from the AP when the requested QoS matches with an existing QoS policy for the STA in the AP or there is no existing QoS policy for the STA in the AP.

An aspect of the disclosure provides an access point (AP), comprising: a wireless medium; and processor circuitry coupled to the wireless medium and configured to: receive a first quality of service (QoS) request message from a station (STA) indicating a requested QoS for a traffic stream from the AP to the STA; and send a first traffic stream applied with the requested QoS to the STA when the requested QoS matches with an existing QoS policy for the STA in the AP or there is no existing QoS policy for the STA in the AP.

An aspect of the disclosure provides a method, comprising: a station (STA) sending a first quality of service (QoS) request message to an access point (AP) indicating a requested QoS for a traffic stream from the AP to the STA; the AP receiving the first QoS request message from the STA and sending a first traffic stream applied with the requested QoS to the STA when the requested QoS matches with an existing QoS policy for the STA in the AP or there is no existing QoS policy for the STA in the AP, and the STA receiving the first traffic stream applied with the requested QoS from AP.

An aspect of the disclosure provides an access point (AP) comprising: a wireless medium; and processor circuitry coupled to the wireless medium and configured to: tentatively allocate network resources in the AP; send a quality of service (QoS) request message to a station (STA) that indicates a requested QoS for a traffic stream from the AP to the STA based on the tentatively allocated network resources; receive a response message from the STA that indicates the STA accepts or rejected the requested QoS; finalize the allocation of the network resources in the AP in response to receiving a response message from the STA that indicates the STA accepts the requested QoS; and send traffic streams applied with the requested QoS to the STA.

An aspect of the disclosure provides a station (STA) comprising: a wireless medium; and processor circuitry coupled to the wireless medium and configured to: receive a quality of service (QoS) request message from an access point (AP) that indicates a requested QoS for a traffic stream from the AP to the STA; send a response message to the AP that indicates the STA accepts or refuses the requested QoS; and receive traffic streams applied with the requested QoS from the AP when the STA accepts the requested QoS.

An aspect of the disclosure provides a method comprising: an access point (AP) tentatively allocating network resources in the AP; the AP sending a quality of service (QoS) request message to a station (STA) that indicates a requested QoS for a traffic stream from the AP to the STA based on the tentatively allocated network resources; the STA sending a response message to the AP that indicates the STA accepts or refuses the requested QoS in response to receiving the QoS request message from the AP; the AP finalizing the allocation of the network resources in the AP in response to receiving the response message from the STA that indicates the STA accepts the requested QoS, and sending traffic streams applied with the requested QoS to the STA; and the STA receiving traffic streams applied with the requested QoS from the AP.

FIG. 1 is a network diagram illustrating an example network environment according to some example embodiments of the disclosure. As shown in FIG. 1, a wireless network 100 may include one or more user devices 102 and one or more access points (APs) 104, which may communicate in accordance with IEEE 802.11 communication standards. The user devices 102 may be mobile devices that are non-stationary (e.g., not having fixed locations) or may be stationary devices.

Figure 10:
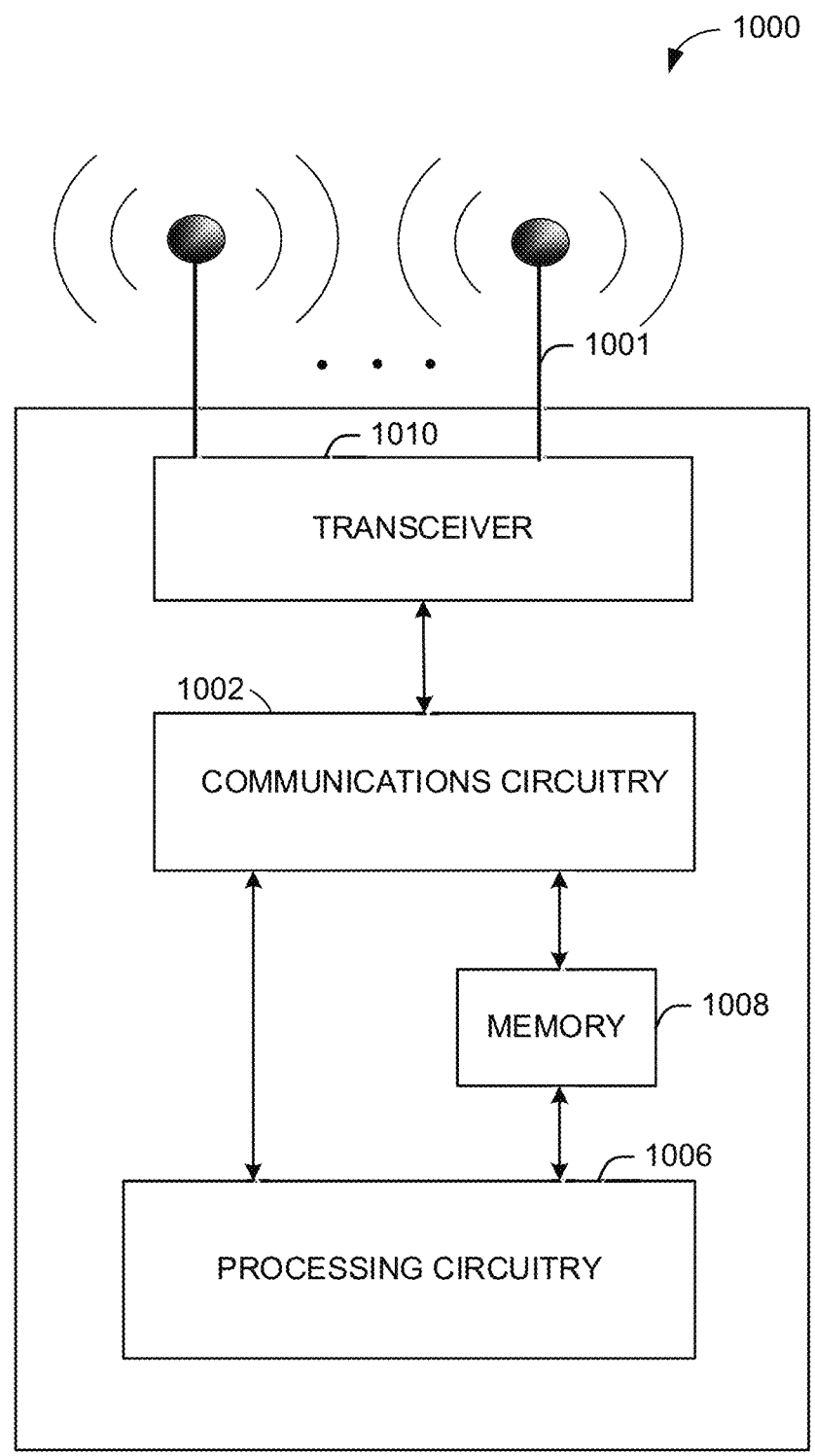
FIG. 10 is a functional diagram of an exemplary communication station 1000, in accordance with one or more example embodiments of the disclosure.
Figure 11:
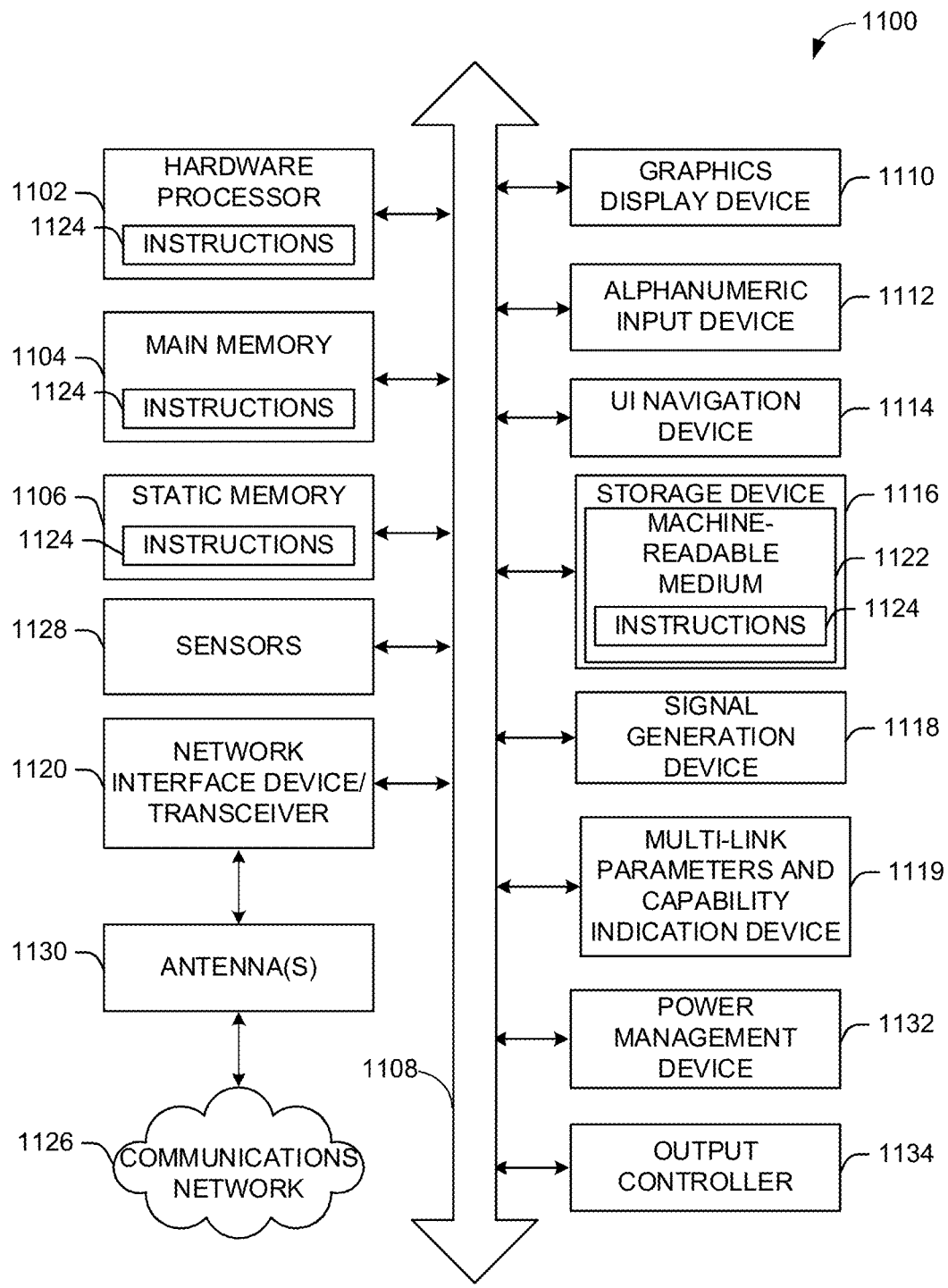
FIG. 11 is a block diagram of an example of a machine or system 1100 upon which any one or more of the techniques (e.g., methodologies) discussed herein may be performed.

In some embodiments, the user devices 102 and APs 104 may include one or more function modules similar to those in the functional diagram of FIG. 10 and/or the example machine/system of FIG. 11.

The one or more user devices 102 and/or APs 104 may be operable by one or more users 110. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more user devices 102 and the one or more APs 104 may be STAs. The one or more user devices 102 and/or APs 104 may operate as a personal basic service set (PBSS) control point/access point (PCP/AP). The user devices 102 (e.g., 1024, 1026, or 1028) and/or APs 104 may include any suitable processor-driven device including, but not limited to, a mobile device or a non-mobile, e.g., a static device. For example, the user devices 102 and/or APs 104 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a personal digital assistant (PDA) device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a personal communications service (PCS) device, a PDA device which incorporates a wireless communication device, a mobile or portable global positioning system (GPS) device, a digital video broadcasting (DVB) device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user devices 102 and/or APs 104 may also include mesh stations in, for example, a mesh network, in accordance with one or more IEEE 802.11 standards and/or 3GPP standards.

Any of the user devices 102 (e.g., user devices 1024, 1026, 1028) and APs 104 may be configured to communicate with each other via one or more communications networks 130 and/or 135 wirelessly or wired. The user devices 102 may also communicate peer-to-peer or directly with each other with or without APs 104. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 102 (e.g., user devices 1024, 1026, 1028) and APs 104 may include one or more communications antennas. The one or more communications antennas may be any suitable type of antennas corresponding to the communications protocols used by the user devices 102 (e.g., user devices 1024, 1026 and 1028) and APs 104. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 102 and/or APs 104.

Any of the user devices 102 (e.g., user devices 1024, 1026, 1028) and APs 104 may be configured to perform directional transmission and/or directional reception in conjunction with wirelessly communicating in a wireless network. Any of the user devices 102 (e.g., user devices 1024, 1026, 1028) and APs 104 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user devices 102 (e.g., user devices 1024, 1026, 1028) and APs 104 may be configured to perform any given directional transmission towards one or more defined transmit sectors. Any of the user devices 102 (e.g., user devices 1024, 1026, 1028) and APs 104 may be configured to perform any given directional reception from one or more defined receive sectors.

MIMO beamforming in a wireless network may be accomplished using radio frequency (RF) beamforming and/or digital beamforming. In some embodiments, in performing a given MIMO transmission, the user devices 102 and/or APs 104 may be configured to use all or a subset of its one or more communications antennas to perform MIMO beamforming.

Any of the user devices 102 (e.g., user devices 1024, 1026, 1028) and APs 104 may include any suitable radio and/or transceiver for transmitting and/or receiving radio frequency (RF) signals in the bandwidth and/or channels corresponding to the communications protocols utilized by any of the user devices 102 and APs 104 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some embodiments, it is proposed to provide 802.11be RU allocation table for resource allocation. The 802.11be RU allocation table may include both RU allocation entries for indicating RUs defined for R1 STAs and RU allocation entries for indicating RUs defined for R2 STAs. R1 and R2 are internal phases in the development of the IEEE802.11be specification to manage the complexity of the protocol development while delivering to market needs on a timely fashion. The RU allocation entries for indicating the RUs defined for the R1 STAs may be different from the RU allocation entries for indicating the RUs defined for the R1 STAs. That is to say, the RU allocation entries for indicating the RUs defined for the R1 STAs may be a part of the RU allocation entries in the 802.11be RU allocation table, and the RU allocation entries for indicating the RUs defined for the R2 STAs may be a different part of the RU allocation entries in the 802.11be RU allocation table.

In some embodiments, similar as 802.11ax RU allocation table, the 802.11be RU allocation table is a 9-bit table which includes 512 RU allocation entries in total, wherein there are about 270 RU allocation entries for indicating the RUs defined for the R1 STAs and a part of or all of the remaining RU allocation entries may be used for indicating the RUs defined for the R2 STAs. The RU allocation entries for indicating the RUs defined for the R1 STAs may be the same as those in the 802.11ax RU allocation table that is previously reused by the 802.11be network.

In some embodiments, with reference to FIG. 1, the user devices 102 may include one or more R1 STAs and one or more R2 STAs, both of which may communicate with any of APs 104 according to 802.11 standards including 802.11be.

Figure 2:
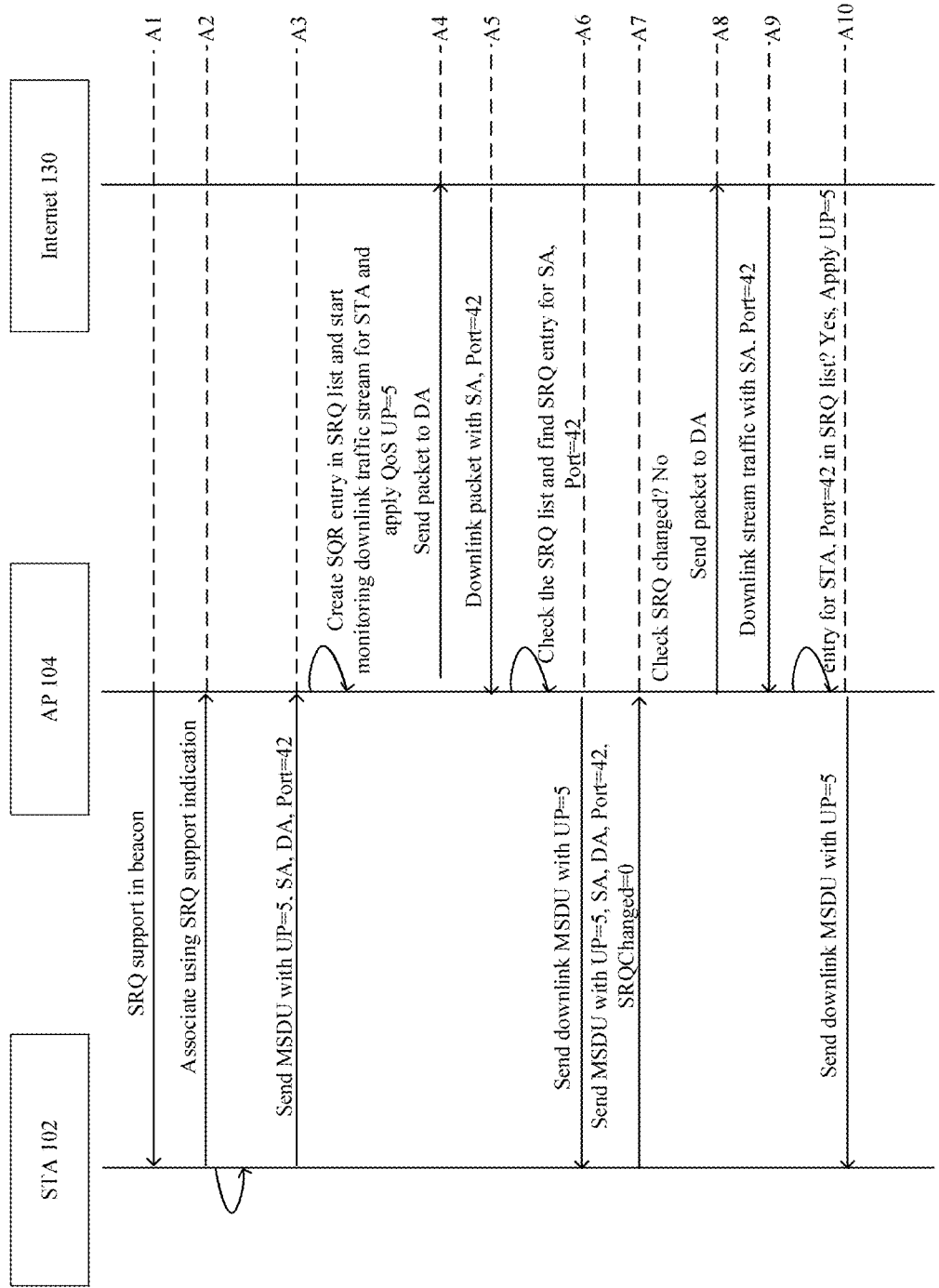
FIG. 2 is a sequence diagram showing the establishment of a QoS agreement between a STA and an AP based on device centric QoS management according to some example embodiments of the disclosure.

FIG. 2 is a sequence diagram showing the establishment of a QoS agreement between STA 102 and AP 104 based on device centric QoS management according to some example embodiments of the disclosure. FIG. 2 shows (i) message exchanges between STA 102 and AP 104 and (ii) message exchanges between AP 104 and core network (Internet) 130. Internet 130 may include possibly other network entities. For simplicity, message exchanges between AP 102 and other network entities are not shown in FIG. 2. Message exchanges among various network entities in Internet 130 are also not shown.

Initially, AP 104 may broadcast WLAN (step A1). Step A1 may include AP broadcasting periodically Simple Reflective QoS (SRQ) support in beacon frames. STA 102 searches for WLAN, detects AP in WLAN, and associates with SRQ enabled AP 104 in WLAN (step A2). Step A2 may include making received signal strength indication (RSSI) measurements, reading beacon frames, exchanging probe request/response, performing access and user authentication, and exchanging association request/response with AP 104. STA 102 may then discover the QoS capability of AP 104, e.g., based on beacon frames transmitted periodically by AP 104, a probe response sent by AP 104 for a probe request sent by STA 102, etc. Steps A1 to A2 may be performed when STA 102 is powered up, when STA 102 moves into a new coverage area, etc.

STA 102 then may initiate a process of establishing a QoS agreement with SRQ enabled AP 104 and receive downlink traffic streams from Internet 130 via AP 104 after associating therewith. When an application on STA 102 requires a traffic stream with a certain QoS, for example, UP=5, STA 102 may send a first QoS request message including information (for example, UP=5, source address (SA), destination address (DA), port=42) of a requested QoS to AP 104 (step A3). The first QoS request message can be sent by using MAC (medium access control) service data unit (MSDU). This will signal AP 104 the requested QoS for downlink traffic streams to STA 102. AP 104 receives the first QoS request message from STA 102 and derives the requested QoS for downlink traffic streams therefrom. After checking network policy for STA 102, AP 104 will create a SRQ entry for downlink traffic stream to STA 102 in its SRQ list based on the requested QoS if there is no such a SRQ entry in in its SRQ list, and start monitoring traffic stream that will be applied with the requested QoS for STA 102. Alternatively, AP 104, after checking network policy for the STA 102, may also directly start monitoring traffic stream that will be applied with the requested QoS for STA 102 if there is a SRQ entry in its SRQ list that has been previously created for STA 102 and matches with the requested QoS as indicated in the QoS request message received from STA 102. AP 104 communicates with Internet 130 to receive traffic streams as requested by STA 102 (step A4 and A5). When AP 104 identifies any traffic stream for STA 102, it checks the SRQ list to find the SRQ entry for that traffic stream, applies the requested QoS to the traffic stream and sends the traffic stream applied with the requested QoS to STA 102 (step A6). After establishing such a QoS agreement with AP 104, STA 102 may continue to request traffic streams with the requested QoS from Internet 130 via AP 104. In particular, STA 102 may send a second QoS request message with the requested QoS (for example, UP=5, SA, DA, port=42) to AP 104 (step A7) and indicates the requested QoS is not changed (as indicated by SRQChanged=0 in step A7). AP 104 receives the second QoS request message from STA 102 and determines the requested QoS is not changed. AP 104 communicates with Internet 130 to receive traffic streams as requested by STA 102 (step A8 and A9). When AP 104 identifies any traffic stream for STA 102, it checks the SRQ list to find the SRQ entry for that traffic stream, applies the requested QoS to the traffic stream and sends the traffic stream applied with the requested QoS to STA 102 (step A10).

Figure 3:
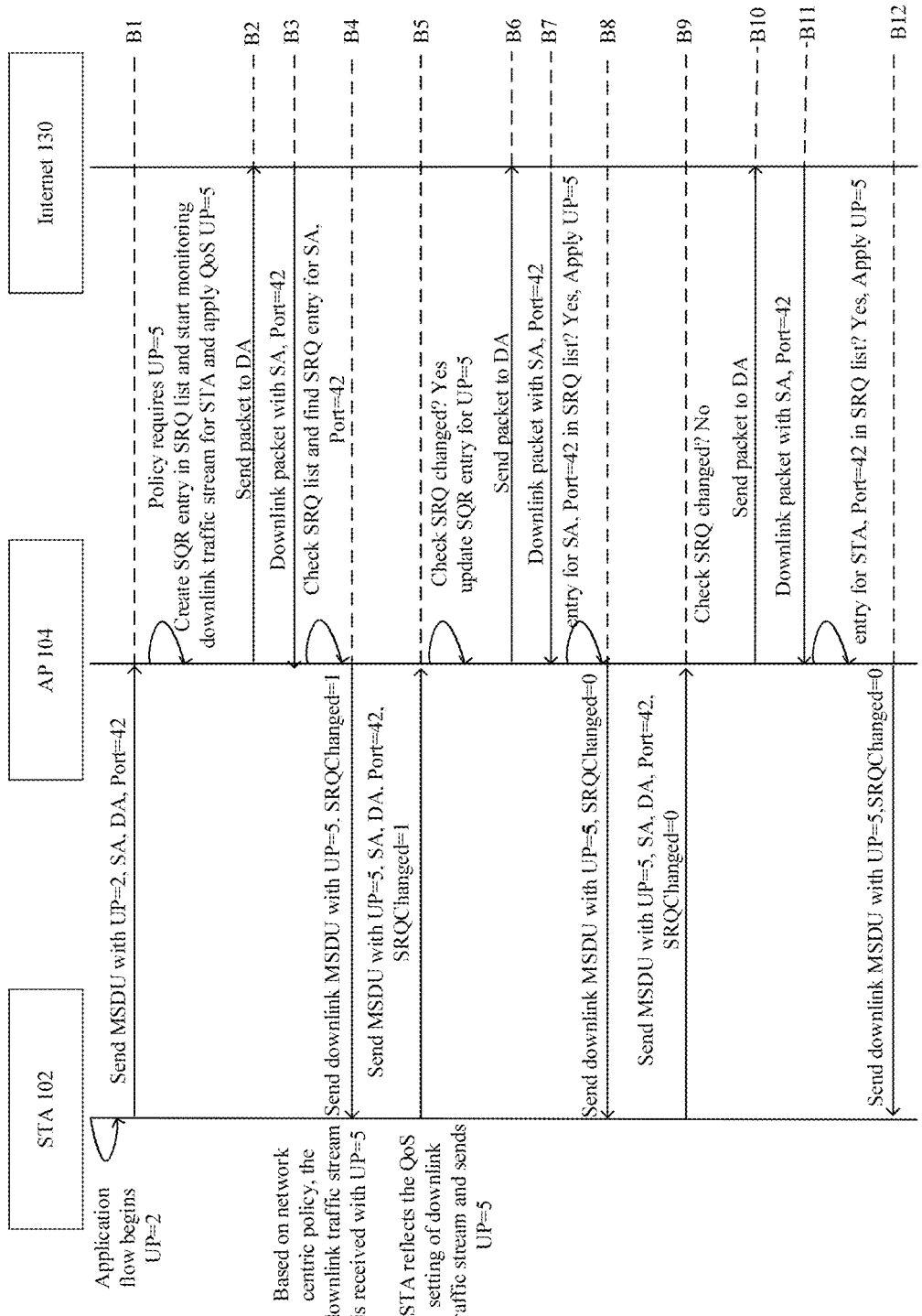
FIG. 3 is a sequence diagram showing updating a QoS agreement established between a STA and an AP based on network centric QoS management according to some example embodiments of the disclosure.

FIG. 3 is a sequence diagram showing updating a QoS agreement established between STA 102 and AP 104 based on network centric QoS management according to some example embodiments of the disclosure. In particular, FIG. 3 shows such a scenario in which the QoS request message sent by STA 102 includes information of a requested QoS that does not match with network policy. In this case, AP 104 will have the ability to apply a QoS policy matching with the network policy for traffic streams to STA 102, which will be described in detail as below.

As shown in FIG. 3, STA 102 sends a first QoS request message including information (for example, UP-2, SA, DA, port=42) of a requested QoS to AP 102 (step B1). After receiving the first QoS request message from STA 102, AP 104 derives the requested QoS for downlink traffic streams therefrom, creates a SRQ entry for downlink traffic streams to STA 102 in its SRQ list based on the requested QoS if there is no such a SRQ entry in AP 104, and start monitoring traffic stream that will be applied with the requested QoS for STA 102. However, AP 104 finds that the network policy now requires downlink traffic stream to STA 102 shall be sent with a higher UP (for example, UP=5). In this case, AP 104 will determine that the requested QoS does not match with the network policy, and decide to apply a QoS policy as required by network policy (UP=5) to the downlink traffic stream to STA 102. AP 104 communicates with Internet 130 to receive traffic stream as requested by STA 102 (step B2 and B3). When AP 104 identifies any traffic stream for STA 102, it applies the QoS policy as required by network policy (UP=5) to that traffic stream, sends the traffic stream applied with the QoS policy to STA 102 (step B4) and indicates the requested QoS is changed (as indicated by SRQChanged=1 in step B4). After receiving the traffic stream from AP 104 which indicates the requested QoS is changed, STA 102 sends a second QoS request message including information (for example, UP=5, SA, DA, port=42) of an updated requested QoS to AP (step B5) and indicates that the requested QoS is changed (as indicated by SRQChanged=1 in step B5). After receiving the second QoS request message which indicates that the requested QoS is changed from STA 102, AP 104 updates the SRQ entry in its SRQ list to match with the updated requested QoS (i.e. the QoS policy as required by network policy). AP 104 continues to communicate with Internet 130 to receive traffic streams as requested by STA 102 (step B6 and B7). When AP 104 identifies any traffic stream for STA 102, it checks the SRQ list to find the SRQ entry for that traffic flow, applies the updated requested QoS to the traffic stream, sends the traffic stream applied with the updated requested QoS to STA 102 (step B8) and indicates the updated requested QoS is not changed (as indicated by SRQChanged=0 in step B8). After establishing such a QoS agreement with AP 104, STA 102 may continue to request traffic streams with the updated requested QoS from Internet 130 via AP 104. In particular, STA 102 may send a third QoS request message including information of the updated requested QoS (for example, UP=5, SA, DA, port=42) to AP 104 (step B9) and indicates the updated requested QoS is not changed (as indicated by SRQChanged=0 in step B9). AP 104 receives the third QoS request message from STA 102 and determines the QoS policy is not changed. AP 102 continues to communicate with Internet 130 to receive the traffic stream as requested by STA 102 (step B10 and B11). When AP identifies any traffic stream for STA 102, it checks its SRQ list to find the SRQ entry for that traffic stream, applies the updated requested QoS to the traffic stream, sends the traffic stream applied with the updated requested QoS to STA 102 (step B12) and indicates that the updated requested QoS is not changed (as indicated by SRQChanged=0 in step B12).

Figure 4:
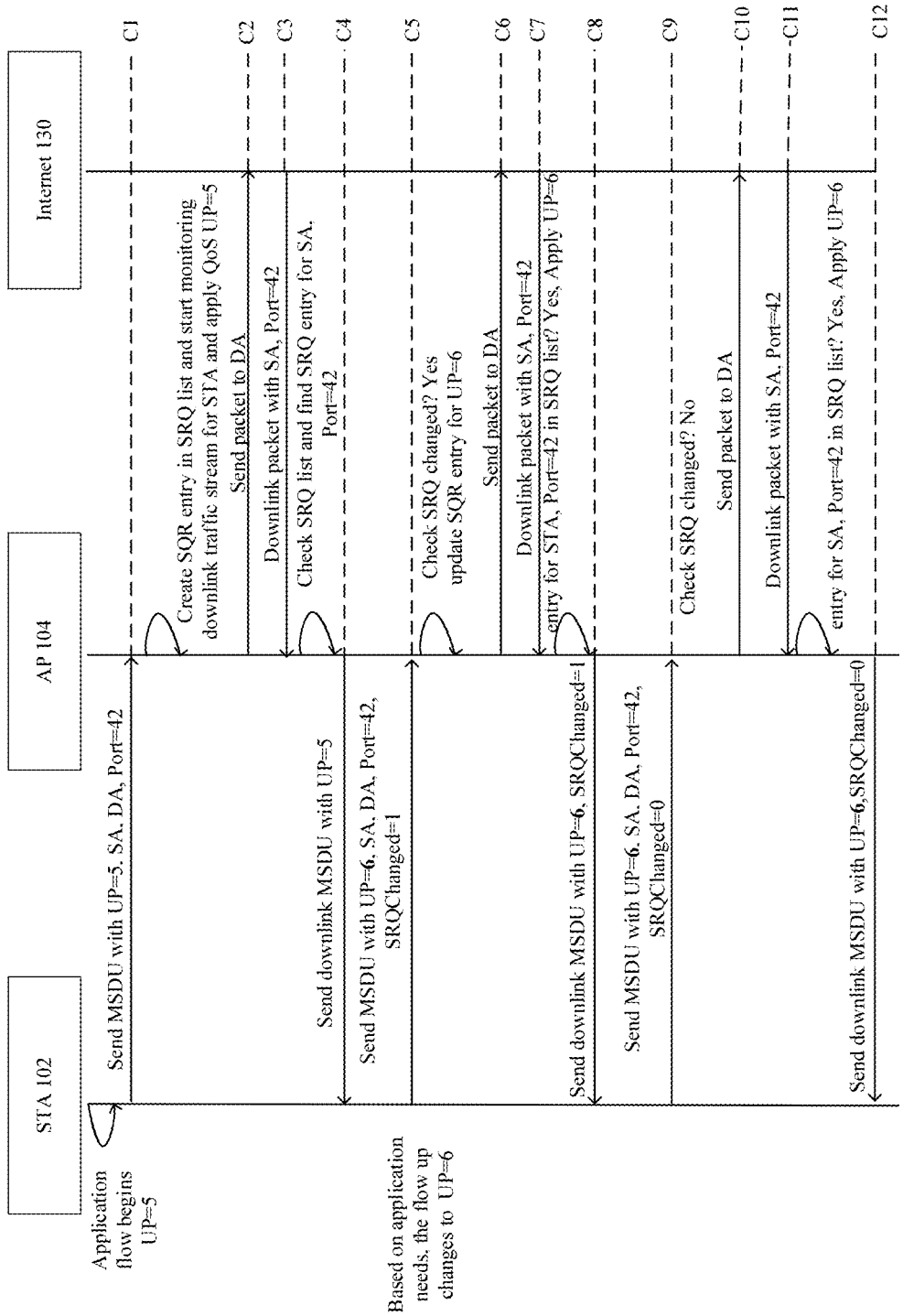
FIG. 4 is a sequence diagram showing updating a QoS agreement established between a STA and an AP based on changes of application needs or network resources changes according to some example embodiments of the disclosure.

FIG. 4 is a sequence diagram showing updating a QoS agreement established between STA 102 and AP 104 based on changes of application needs or network resources according to some example embodiments of the disclosure. As indicated in FIG. 4, STA 102 establishes a QoS agreement with AP 104 by sending a first QoS request message including information (for example, UP=5, SA, DA, port=42) of a requested QoS to AP 104 and receives traffic streams applied with the requested QoS (UP=5) from AP 104 (steps C1-C4). The operations of steps C1-C4 are similar to those of steps A3-A6 in FIG. 2 and will not be described in detail anymore. At step C5, STA 102 sends a second QoS request message including information (for example, UP=6, SA, DA, port=42) of an updated QoS to AP 104 based on the changes of application needs on STA 102 and indicates the requested QoS is changed (as indicated by SRQChanged=1 in step C5). After receiving the second QoS request message which indicates the requested QoS is changed from STA 102, AP 104 updates the SRQ entry in its SRQ list to match with the updated requested QoS (UP=6). AP 104 communicates with Internet 130 to receive traffic streams as requested by STA 102 (step C6 and C7). When AP identifies any traffic stream for STA 102, it checks the SRQ list to find the SRQ entry for that traffic flow, applies the updated requested QoS (UP=6) for the traffic stream, sends the traffic stream applied with the updated requested QoS to STA 102 (step C8) and indicates that the requested QoS is changed (as indicated by SRQChanged=1 in step C8). After establishing such a QoS agreement with AP 104, STA 102 may continue to request traffic streams with the updated requested QoS from Internet 130 via AP 104. In particular, STA 102 may send a third QoS request message including information of the updated requested QoS (for example, UP=6, SA, DA, port=42) to AP 104 (step C9) and indicates that the updated requested QoS is not changed (as indicated by SRQChanged=0 in step C9). AP 104 receives the third QoS request message from STA and determines the updated requested QoS is not changed. AP 104 continues to communicate with Internet 130 to receive the traffic stream as requested by STA 102 (step C10 and C11). When AP 104 identifies any traffic stream for STA 102, it checks its SRQ list to find the SRQ entry for that traffic stream, applies the updated requested QoS to the traffic stream, sends the traffic stream applied with the updated requested QoS to STA 102 (step C12) and indicates that the updated requested QoS is not changed (as indicated by SRQChanged=0 in step C12).

It should be noted although FIG. 4 shows the scenario in which STA 102 initiates the process of updating the requested QoS based on changes of application needs on STA 102, AP 104 can also initiate such a process based on, for example, changes of network resources. It can be known from FIG. 4 that the requested QoS can be modified per traffic stream and reflected in the opposite direction of the traffic stream. Both STA 102 and AP 104 can derive the information of the requested QoS marked with the SRQ if such requested QoS does not exist already in either STA 102 or AP 104. For each traffic stream, STA 102 or AP 104 can indicate if the QoS (for example, UP) of current traffic stream is the same or different from the UP of previous traffic stream. If the UP of current traffic stream is different from the UP of previous traffic stream, the QoS entry in the SRQ list will be updated so that new QoS policy will be applied to the subsequent traffic stream in opposite traffic streams transmission direction.

Figure 5:
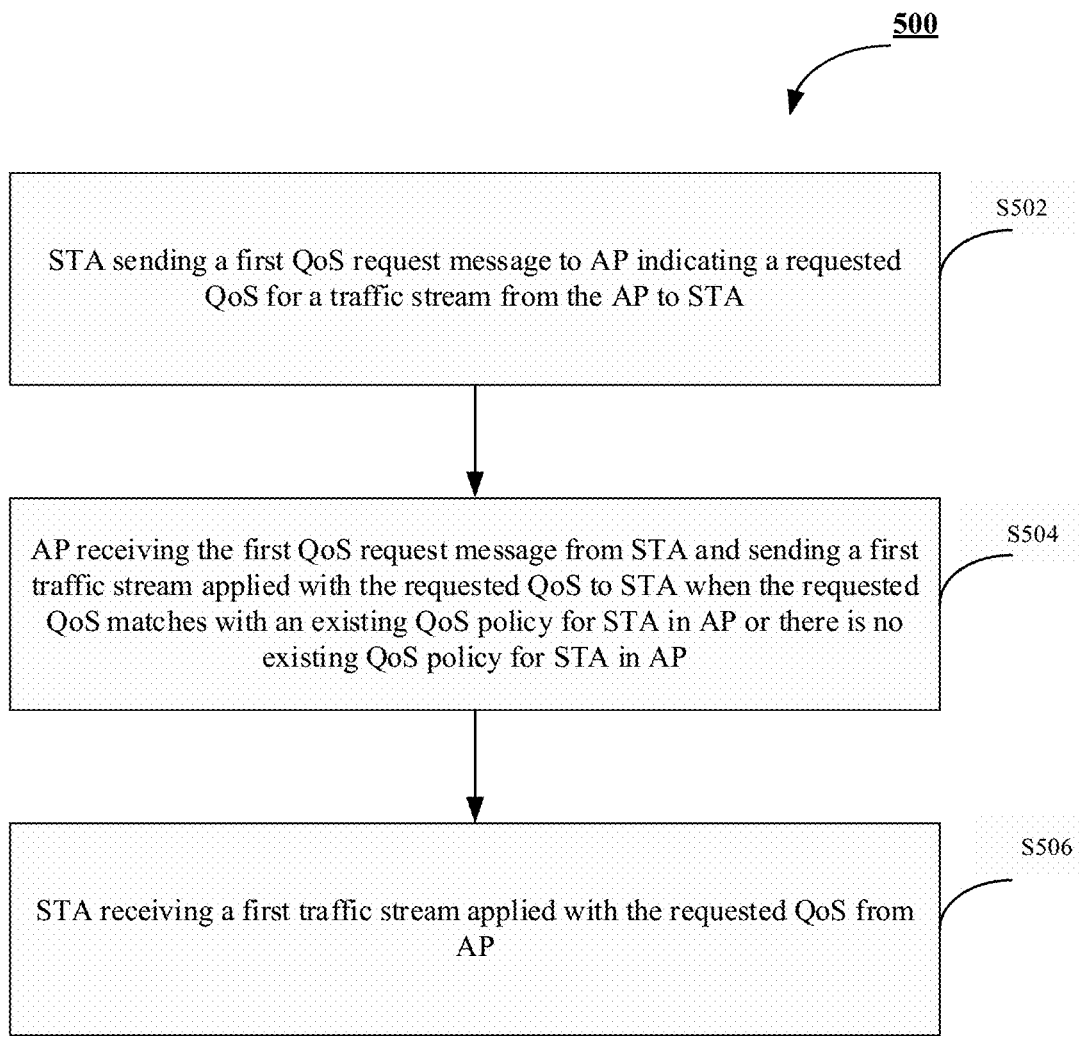
FIG. 5 is a flowchart showing a method 500 according to some example embodiment of the disclosure.

FIG. 5 is a flowchart showing a method 500 according to some example embodiment of the disclosure. As shown in FIG. 5, the method 500 comprises: S502, a station (STA) sending a first quality of service (QoS) request message to an access point (AP) indicating a requested QoS for a traffic stream from the AP to the STA; S504, the AP receiving the first QoS request message from the STA and sending a first traffic stream applied with the requested QoS to the STA when the requested QoS matches with an existing QoS policy for the STA in the AP or there is no existing QoS policy for the STA in the AP; and S506, the STA receiving a first traffic stream applied with the requested QoS from AP.

In some embodiments, the method further comprises: the AP sending the first traffic stream applied with the existing QoS policy to the STA when the requested QoS does not match with the existing QoS policy for the STA in the AP; the STA sending a second QoS request message to the AP that indicates changing the requested QoS to match with the existing QoS policy in response to receiving the first traffic stream applied with the existing QoS policy; the AP sending a second traffic stream applied with the existing QoS policy to the STA in response to receiving the second QoS request message that indicates changing the requested QoS to match with the existing QoS policy; and the STA receiving the second traffic stream applied with the existing QoS policy from the AP.

In some embodiments, the method further comprises: the STA sending a second QoS request message to the AP indicating an updated requested QoS for a traffic stream from the AP to the STA; the AP sending a second traffic stream applied with the updated requested QoS to the STA when the AP accepts the updated requested QoS; and the STA receiving the second traffic stream applied with the updated requested QoS from the AP In some embodiments, the existing QoS policy for the STA in the AP is created based on a previous QoS request message.

Figure 6:
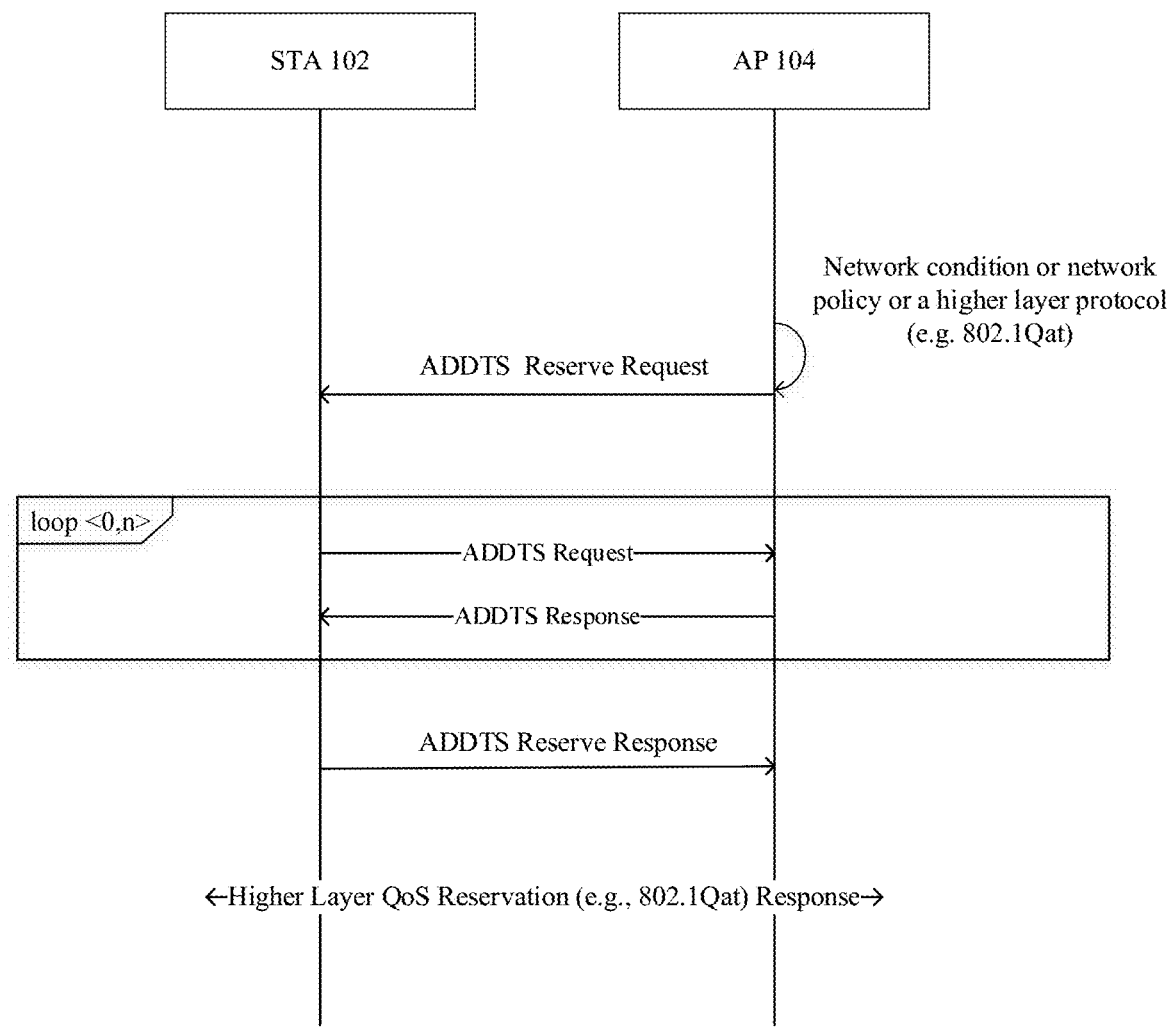
FIG. 6 is a sequence diagram showing the establishment of a QoS agreement with STA by AP reacting to a higher layer protocol according to conventional art.

FIG. 6 is a sequence diagram showing the establishment of a QoS agreement with STA 102 by AP 104 reacting to a higher layer protocol according to conventional art. As shown in FIG. 6, AP 104 reacts to higher layer protocol (e.g., IEEE802.1Qat Stream Reservation Protocol) or to enterprise network policy changes and sends an ADDTS Reserve Request to STA 102 with a set of parameters that describe the traffic, the QoS required for the traffic and other characteristics of the traffic that AP 104 and the STA 102 require in order to provide the required QoS. AP 104 may allocate resources for handling the traffic at this time or wait till the STA 102 responds with an ADDTS Request (and then allocates the required resources). STA 102 on receipt of the ADDTS Reserve Request uses the content of the received frame to construct an ADDTS Request and sends it to AP 102. AP 102 responds with an ADDTS Response which is most likely to succeed since AP 104 would have performed a resource budget estimate prior to sending the ADDTS Reserve Request. STA 102 on receipt of the ADDTS Response from AP 104, sends an ADDTS Reserve Response to AP 104.

Figure 7:
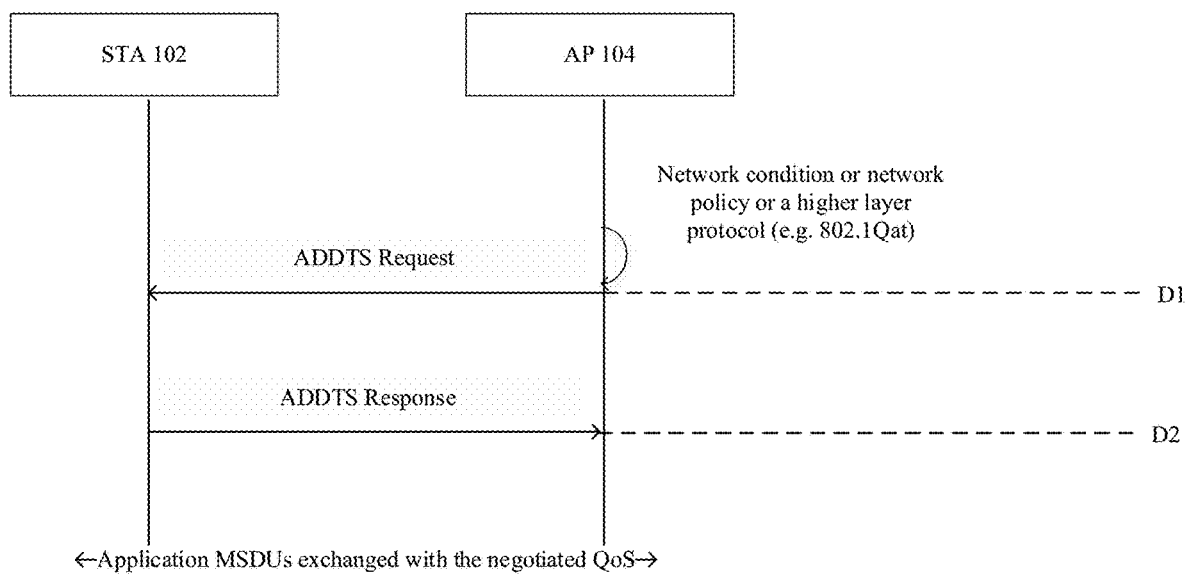
FIG. 7 is a sequence diagram showing the establishment of a QoS agreement with STA by AP reacting to a higher layer protocol according to some example embodiments of the disclosure.

FIG. 7 is a sequence diagram showing the establishment of a QoS agreement with STA 102 by AP 104 reacting to a higher layer protocol according to some example embodiments of the disclosure. As shown in FIG. 7, AP 104 send a QoS request message to STA 102 that indicates a requested QoS for a traffic stream from the AP 104 to the STA 102 based on the tentatively allocated network resources. In particular, AP 103 may, based on a higher layer protocol like IEEE802.1Qat SRP, current network conditions or policies and application priorities etc. construct a TSPEC, tentatively allocate corresponding resources in AP 104 and send an ADDTS Request to STA 102 to inform STA 102 a requested QoS for the traffic stream from AP 104 to STA 102 (step D1). STA 102, after receiving the QoS request message from AP 104, sends a response message to AP 104 that indicates it accepts or refuses the requested QoS. In one embodiment, STA 102, after receiving the ADDTS request from AP 102, checks its policy etc., and agrees to establishment of a new traffic flow with the requested QoS and sends an ADDTS Response confirming it (step D2). AP 104, after receiving the ADDTS Response from STA 102 that accepts the requested QoS, finalizes the resource allocation in AP 104 and the remainder of the traffic stream is treated based on the requested QoS. As compared to the process shown in FIG. 6 in which four (or more) frames need to be changed to complete the stream reservation, the process in FIG. 7 only needs two frames to complete the stream reservation and the time to initiate QoS traffic flow is reduced.

Figure 8:
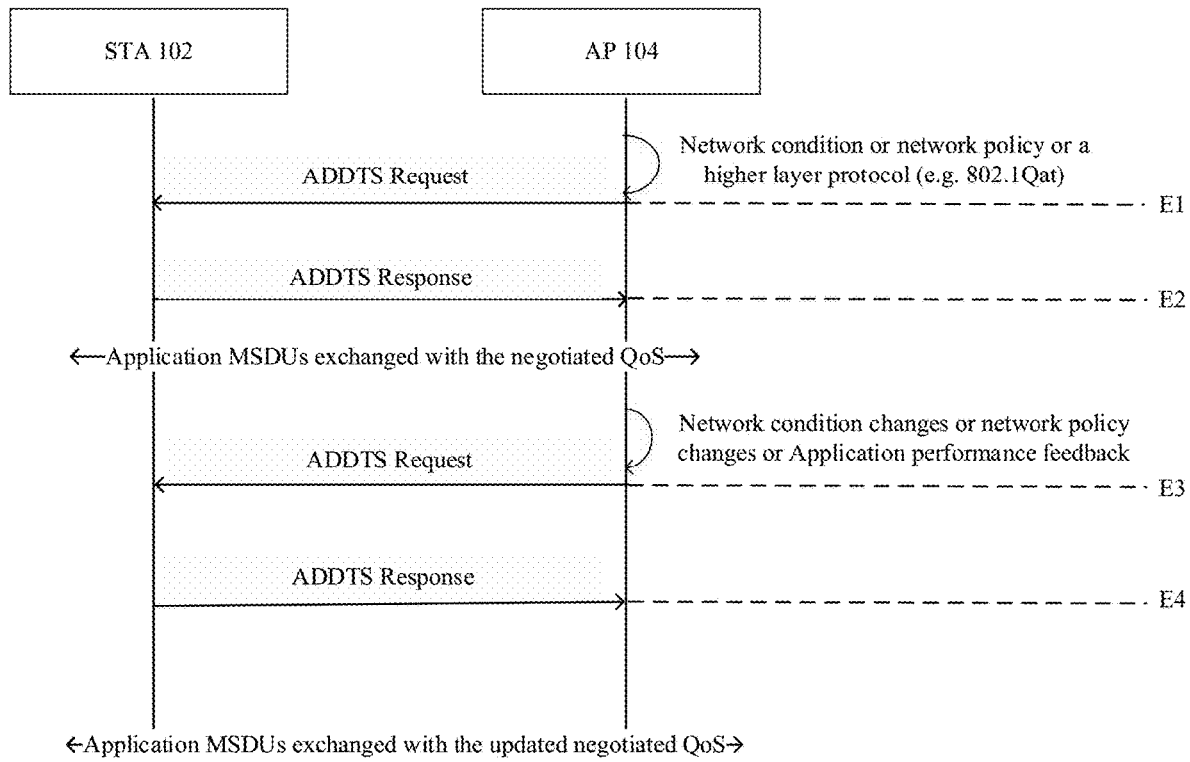
FIG. 8 is a sequence diagram showing updating a QoS agreement established with STA by AP reacting to a higher layer protocol according to some example embodiments of the disclosure.

FIG. 8 is a sequence diagram showing updating a QoS agreement established with STA by AP reacting to a higher layer protocol according to some example embodiments of the disclosure. The operations of step E1-E2 in FIG. 8 are similar to those of steps D1-D2 in FIG. 7 and will not be described in detail anymore. If network conditions, network policy or application performance feedback requires a change in the QoS agreement established between STA 102 and AP 104 after successful QoS negotiation and traffic initiation therebetween, the AP 104 (or STA 102) may initiate a ADDTS Request/Response exchange to change the negotiated QoS. In one embodiment, AP 104 may send an updated QoS request message to STA 102 that indicates an updated requested QoS for a traffic stream from AP 104 to STA 102 in response to a change in the requested QoS. As indicated in FIG. 8, AP 104 may send another ADDTS Request to STA 102 to inform STA 102 an updated requested QoS for traffic stream from AP 104 to STA 102 (step E3). STA 102, after receiving the QoS request message from AP 104, sends a response message to AP 104 that indicates it accepts or refuses the updated requested QoS. In one embodiment, STA 102, after receiving the ADDTS request from AP 102, checks its policy etc., and agrees to establishment of a new traffic flow with the requested QoS and sends an ADDTS Response confirming it (step E4). AP 104, after receiving the ADDTS Response from STA 102 that accepts the updated requested QoS, will treat the remainder of the traffic stream based on the updated requested QoS.

It should be noted although FIG. 8 shows the scenario in which AP 104 initiates the process of updating the requested QoS based on network conditions change, network policy changes or application performance feedback, STA 102 can also initiate such a process based on, for example, network conditions change, network policy changes or application performance feedback, just as indicated above.

Figure 9:
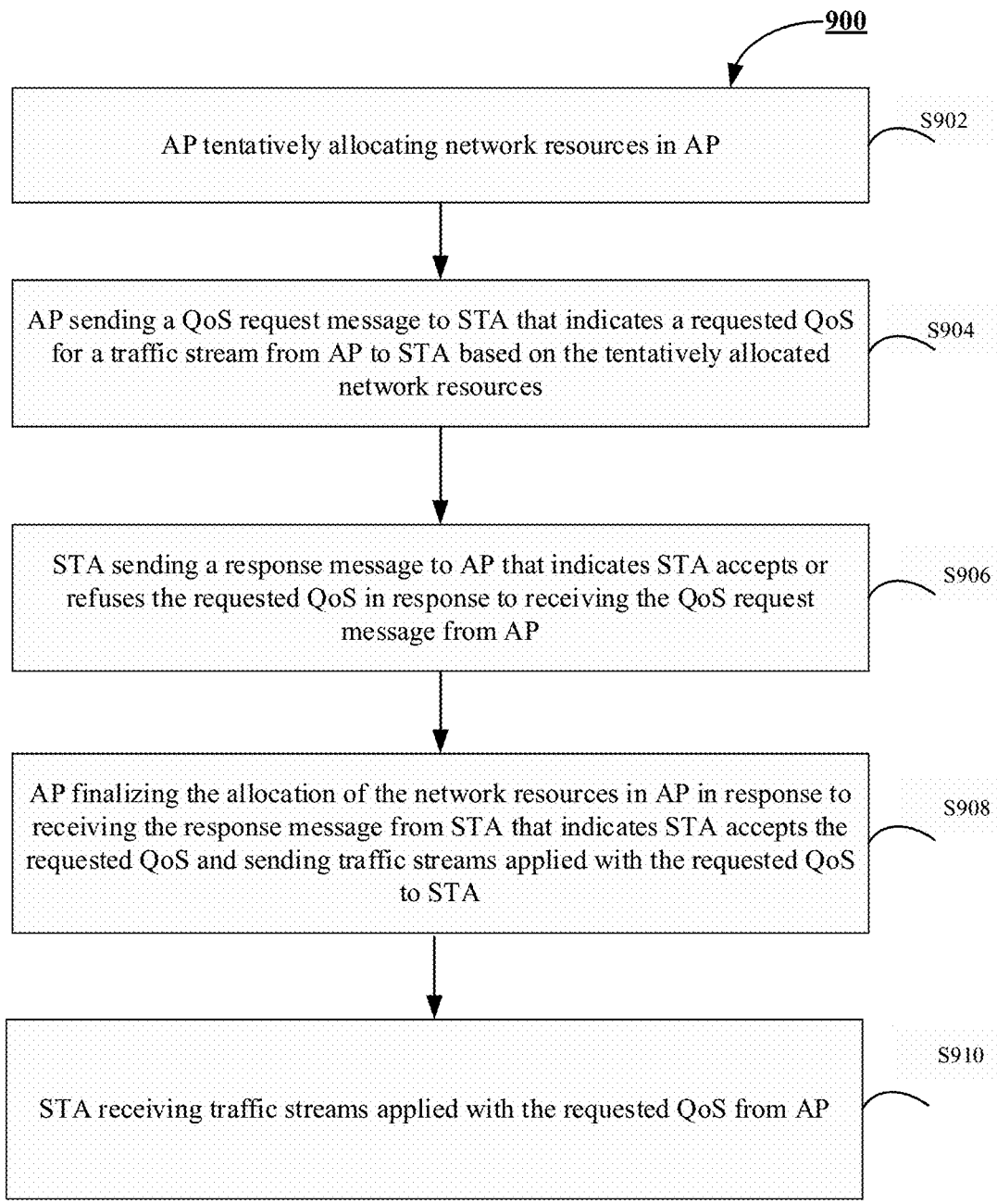
FIG. 9 is a flowchart showing a method 900 according to some example embodiment of the disclosure.

FIG. 9 is a flowchart showing a method 900 according to some example embodiment of the disclosure. As shown in FIG. 9, the method 900 comprises: S902, an access point (AP) tentatively allocating network resources in the AP; S904, the AP sending a quality of service (QoS) request message to a station (STA) that indicates a requested QoS for a traffic stream from the AP to the STA based on the tentatively allocated network resources; S906, the STA sending a response message to the AP that indicates the STA accepts or refuses the requested QoS in response to receiving the QoS request message from the AP; S908, the AP finalizing the allocation of the network resources in the AP in response to receiving the response message from the STA that indicates the STA accepts the requested QoS, and sending traffic streams applied with the requested QoS to the STA; and S910, the STA receiving traffic streams applied with the requested QoS from the AP.

In some embodiments, the method 900 further comprises: the AP sending an updated QoS request message to the STA that indicates an updated requested QoS for a traffic stream from the AP to the STA in response to a change in the requested QoS; the STA sending a response message to the AP that indicates the STA accepts or refuses the updated requested QoS in response to receiving the updated QoS request message from the AP; the AP sending traffic streams applied with the updated requested QoS to the STA in response to receiving the updated response message from the STA that indicates the STA accepts the updated requested QoS; and the STA receiving the traffic streams applied with the updated requested QoS the AP.

In some embodiments, the method 900 further comprises: the STA sending an updated QoS request message to the AP that indicates an updated requested QoS for a traffic stream from the AP to the STA in response to a change in the requested QoS; the AP sending a response message to the STA that indicates the AP accepts or refuses the updated requested QoS in response to receiving the updated QoS request message from the STA; the AP sending traffic streams applied with the updated requested QoS when the AP accepts the updated requested QoS; and the STA receiving the traffic streams applied with the updated requested QoS from the AP.

In some embodiments, the AP tentatively allocate network resources based on current network conditions, policies and application priorities.

In some embodiments, the STA accepts or refuses the requested QoS based on current network conditions, policies or application priorities.

In some embodiments, the STA accepts or refuses the updated requested QoS based on current network conditions, policies or application priorities.

In some embodiments, the AP accepts or refuses the updated requested QoS based on current network conditions, policies or application priorities.

FIG. 10 shows a functional diagram of an exemplary communication station 1000, in accordance with one or more example embodiments of the disclosure. In one embodiment, FIG. 10 illustrates a functional block diagram of a communication station that may be suitable for use as the AP 104 (FIG. 1) or the user device 102 (FIG. 1) in accordance with some embodiments. The communication station 1000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1000 may include communications circuitry 1002 and a transceiver 1010 for transmitting and receiving signals to and from other communication stations using one or more antennas 1001. The communications circuitry 1002 may include circuitry that can operate the physical layer (PHY) communications and/or medium access control (MAC) communications for controlling access to the wireless medium, and/or any other communications layers for transmitting and receiving signals. The communication station 1000 may also include processing circuitry 1006 and memory 1008 arranged to perform the operations described herein. In some embodiments, the communications circuitry 1002 and the processing circuitry 1006 may be configured to perform operations detailed in the above figures, diagrams, and flows.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc. In some embodiments, the processing circuitry 1006 of the communication station 1000 may include one or more processors. In other embodiments, two or more antennas 1001 may be coupled to the communications circuitry 1002 arranged for transmitting and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device, read-only memory (ROM), random-access memory (RAM), magnetic disk storage media, optical storage media, flash-memory devices and other storage devices and media.

In some embodiments, the communication station 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1000 may include one or more antennas 1001. The antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1000 may include one or more of a keyboard, a display, a non-volatile memory port, multiple antennas, a graphics processor, an application processor, speakers, and other mobile device elements. The display may be an liquid crystal display (LCD) screen including a touch screen.

Although the communication station 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1000 may include one or more processors and may be configured with instructions stored on a computer-readable storage device.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., a speaker), a multi-link parameters and capability indication device 1119, a network interface device/transceiver 1120 coupled to antenna(s) 1130, and one or more sensors 1128, such as a global positioning system (GPS) sensor, a compass, an accelerometer, or other sensor. The machine 800 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the disclosure may be carried out by a baseband processor. The baseband processor may be configured to generate corresponding baseband signals. The baseband processor may further include physical layer (PHY) and medium access control layer (MAC) circuitry, and may further interface with the hardware processor 1102 for generation and processing of the baseband signals and for controlling operations of the main memory 1104, the storage device 1116, and/or the multi-link parameters and capability indication device 1119. The baseband processor may be provided on a single radio card, a single chip, or an integrated circuit (IC).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The multi-link parameters and capability indication device 1119 may carry out or perform any of the operations and processes described and shown above.

It is understood that the above are only a subset of what the multi-link parameters and capability indication device 1119 may be configured to perform and that other functions included throughout this disclosure may also be performed by the multi-link parameters and capability indication device 1119.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 12:
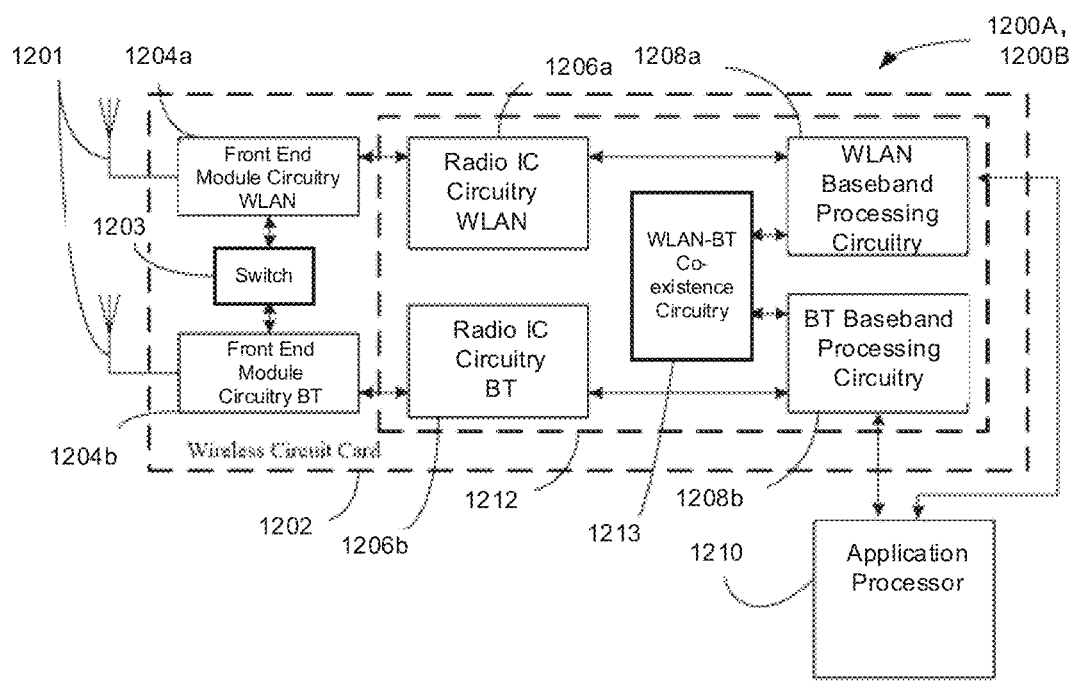
FIG. 12 is a block diagram of a radio architecture 1200A, 1200B in accordance with some embodiments that may be implemented in any one of APs 104 and/or the user devices 102 of FIG. 1.

FIG. 12 is a block diagram of a radio architecture 1200A, 1200B in accordance with some embodiments that may be implemented in any one of APs 104 and/or the user devices 102 of FIG. 1. Radio architecture 1200A, 1200B may include radio front-end module (FEM) circuitry 1204a-b, radio IC circuitry 1206a-b and baseband processing circuitry 1208a-b. Radio architecture 1200A, 1200B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1204a-b may include a WLAN or Wi-Fi FEM circuitry 1204a and a Bluetooth (BT) FEM circuitry 1204b. The WLAN FEM circuitry 1204a may include a receive signal path comprising circuitry configured to operate on WLAN RF signals received from one or more antennas 1201, to amplify the received signals and to provide the amplified versions of the received signals to the WLAN radio IC circuitry 1206a for further processing. The BT FEM circuitry 1204b may include a receive signal path which may include circuitry configured to operate on BT RF signals received from one or more antennas 1201, to amplify the received signals and to provide the amplified versions of the received signals to the BT radio IC circuitry 1206b for further processing. FEM circuitry 1204a may also include a transmit signal path which may include circuitry configured to amplify WLAN signals provided by the radio IC circuitry 1206a for wireless transmission by one or more of the antennas 1201. In addition, FEM circuitry 904b may also include a transmit signal path which may include circuitry configured to amplify BT signals provided by the radio IC circuitry 1206b for wireless transmission by the one or more antennas. In the embodiment of FIG. 12, although FEM 1204a and FEM 1204b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1206a-b as shown may include WLAN radio IC circuitry 1206a and BT radio IC circuitry 1206b. The WLAN radio IC circuitry 1206a may include a receive signal path which may include circuitry to down-convert WLAN RF signals received from the FEM circuitry 1204a and provide baseband signals to WLAN baseband processing circuitry 1208a. BT radio IC circuitry 1206b may in turn include a receive signal path which may include circuitry to down-convert BT RF signals received from the FEM circuitry 1204b and provide baseband signals to BT baseband processing circuitry 1208b. WLAN radio IC circuitry 1206a may also include a transmit signal path which may include circuitry to up-convert WLAN baseband signals provided by the WLAN baseband processing circuitry 1208a and provide WLAN RF output signals to the FEM circuitry 1204a for subsequent wireless transmission by the one or more antennas 1201. BT radio IC circuitry 1206b may also include a transmit signal path which may include circuitry to up-convert BT baseband signals provided by the BT baseband processing circuitry 1208b and provide BT RF output signals to the FEM circuitry 1204b for subsequent wireless transmission by the one or more antennas 1201. In the embodiment of FIG. 12, although radio IC circuitries 1206a and 1206b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1208a-b may include a WLAN baseband processing circuitry 1208a and a BT baseband processing circuitry 1208b. The WLAN baseband processing circuitry 1208a may include a memory, such as, for example, a set of RAM arrays in a Fast Fourier Transform or Inverse Fast Fourier Transform block (not shown) of the WLAN baseband processing circuitry 1208a. Each of the WLAN baseband circuitry 908a and the BT baseband circuitry 1208b may further include one or more processors and control logic to process the signals received from the corresponding WLAN or BT receive signal path of the radio IC circuitry 1206a-b, and to also generate corresponding WLAN or BT baseband signals for the transmit signal path of the radio IC circuitry 1206a-b. Each of the baseband processing circuitries 1208a and 1208b may further include physical layer (PHY) and medium access control layer (MAC) circuitry, and may further interface with a device for generation and processing of the baseband signals and for controlling operations of the radio IC circuitry 906a-b.

Referring still to FIG. 12, according to the shown embodiment, WLAN-BT coexistence circuitry 1213 may include logic providing an interface between the WLAN baseband circuitry 1208a and the BT baseband circuitry 1208b to enable use cases requiring WLAN and BT coexistence. In addition, a switch 1203 may be provided between the WLAN FEM circuitry 1204a and the BT FEM circuitry 1204b to allow switching between the WLAN and BT radios according to application needs. In addition, although the antennas 1201 are depicted as being respectively connected to the WLAN FEM circuitry 1204a and the BT FEM circuitry 1204*b*, embodiments include within their scope the sharing of one or more antennas as between the WLAN and BT FEMs, or the provision of more than one antenna connected to each of FEM 1204*a* or 1204*b*.

In some embodiments, the front-end module circuitry 1204*a-b*, the radio IC circuitry 1206*a-b*, and baseband processing circuitry 1208*a-b* may be provided on a single radio card, such as wireless radio card. In some other embodiments, the one or more antennas 1201, the FEM circuitry 1204*a-b* and the radio IC circuitry 1206*a-b* may be provided on a single radio card. In some other embodiments, the radio IC circuitry 1206*a-b* and the baseband processing circuitry 1208*a-b* may be provided on a single chip or integrated circuit (IC), such as IC 1212.

In some embodiments, the wireless radio card 1202 may include a WLAN radio card and may be configured for Wi-Fi communications, although the scope of the embodiments is not limited in this respect. In some of these embodiments, the radio architecture 1200A, 1200B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1200A, 1200B may be part of a Wi-Fi communication station (STA) such as a wireless access point (AP), a base station or a mobile device including a Wi-Fi device. In some of these embodiments, radio architecture 1200A, 1200B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 1200A, 1200B may also be suitable to transmit and/or receive communications in accordance with other techniques and standards.

In some embodiments, the radio architecture 1200A, 1200B may be configured for high-efficiency Wi-Fi (HEW) communications in accordance with the IEEE 802.11ax standard. In these embodiments, the radio architecture 1200A, 1200B may be configured to communicate in accordance with an OFDMA technique, although the scope of the embodiments is not limited in this respect.

In some other embodiments, the radio architecture 1200A, 1200B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 12, the BT baseband circuitry 1208*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 1200A, 1200B may include other radio cards, such as a cellular radio card configured for cellular (e.g., 5GPP such as LTE, LTE-Advanced or 7G communications).

In some IEEE 802.11 embodiments, the radio architecture 1200A, 1200B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 13:
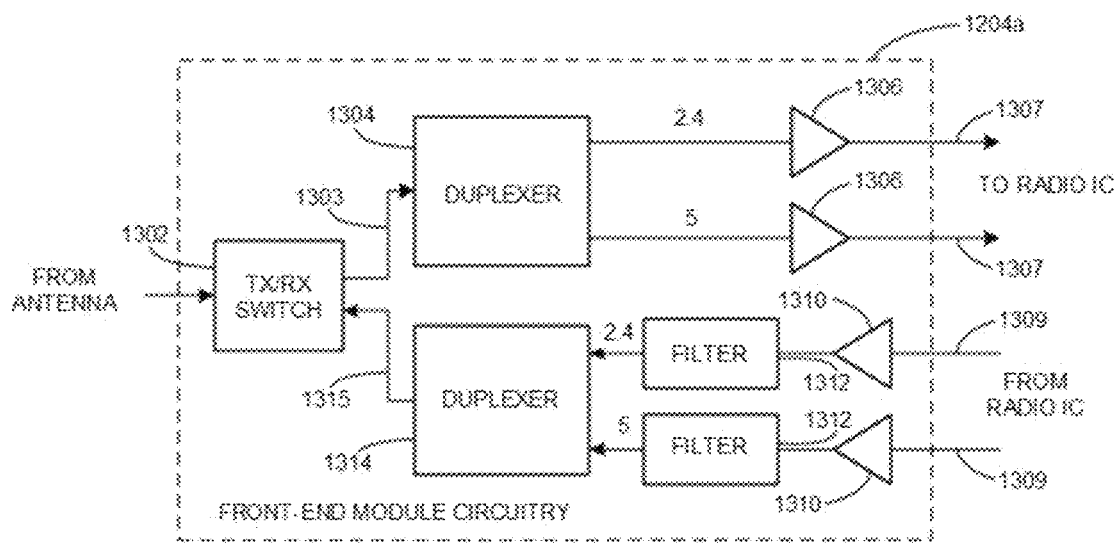
FIG. 13 illustrates WLAN FEM circuitry 1204*a* in accordance with some embodiments.

FIG. 13 illustrates WLAN FEM circuitry 1204*a* in accordance with some embodiments. Although the example of FIG. 13 is described in conjunction with the WLAN FEM circuitry 1204*a*, the example of FIG. 13 may be described in conjunction with the example BT FEM circuitry 1204*b* (FIG. 12), although other circuitry configurations may also be suitable.

In some embodiments, the FEM circuitry 1204*a* may include a TX/RX switch 1302 to switch between transmit mode and receive mode operation. The FEM circuitry 1204*a* may include a receive signal path and a transmit signal path. The receive signal path of the FEM circuitry 1204*a* may include a low-noise amplifier (LNA) 1306 to amplify received RF signals 1303 and provide the amplified received RF signals 1307 as an output (e.g., to the radio IC circuitry 1206*a-b* (FIG. 12)). The transmit signal path of the circuitry 1204*a* may include a power amplifier (PA) to amplify input RF signals 1309 (e.g., provided by the radio IC circuitry 1206*a-b*), and one or more filters 1312, such as band-pass filters (BPFs), low-pass filters (LPFs) or other types of filters, to generate RF signals 1315 for subsequent transmission (e.g., by one or more of the antennas 1201 (FIG. 9)) via an example duplexer 1314.

In some dual-mode embodiments for Wi-Fi communication, the FEM circuitry 1204*a* may be configured to operate in either the 2.4 GHz frequency spectrum or the 5 GHz frequency spectrum. In these embodiments, the receive signal path of the FEM circuitry 1204*a* may include a receive signal path duplexer 1304 to separate the signals from each spectrum as well as provide a separate LNA 1306 for each spectrum as shown. In these embodiments, the transmit signal path of the FEM circuitry 1204*a* may also include a power amplifier 1310 and a filter 1312, such as a BPF, an LPF or another type of filter for each frequency spectrum and a transmit signal path duplexer 1304 to provide the signals of one of the different spectrums onto a single transmit path for subsequent transmission by the one or more of the antennas 1201 (FIG. 12). In some embodiments, BT communications may utilize the 2.4 GHz signal paths and may utilize the same FEM circuitry 1204*a* as the one used for WLAN communications.

Figure 14:
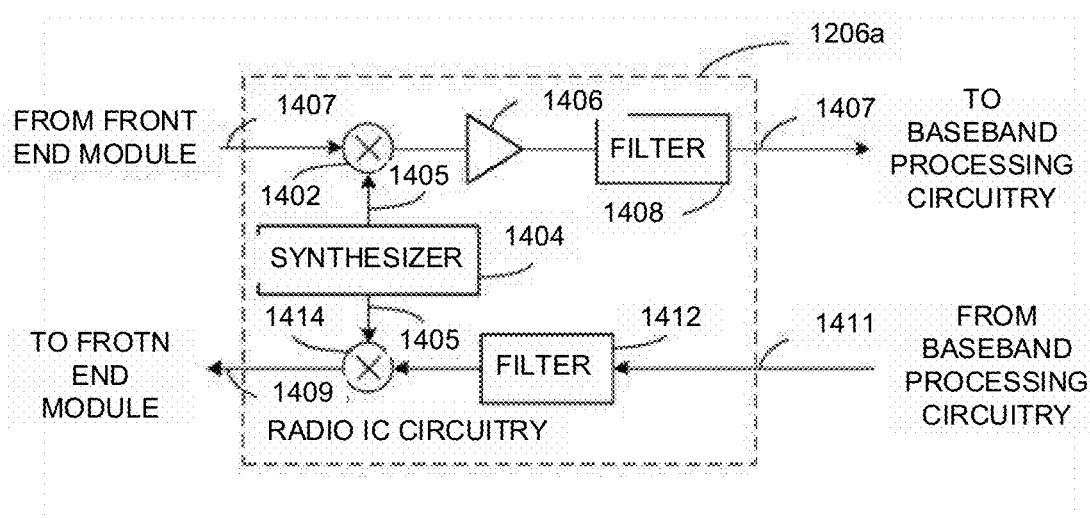
FIG. 14 illustrates radio IC circuitry 1206*a* in accordance with some embodiments.

FIG. 14 illustrates radio IC circuitry 1206*a* in accordance with some embodiments. The radio IC circuitry 1206*a* is one example of circuitry that may be suitable for use as the WLAN or BT radio IC circuitry 1206*a*/1206*b* (FIG. 12), although other circuitry configurations may also be suitable. Alternatively, the example of FIG. 14 may be described in conjunction with the example BT radio IC circuitry 1206*b*.

In some embodiments, the radio IC circuitry 1206*a* may include a receive signal path and a transmit signal path. The receive signal path of the radio IC circuitry 1206*a* may include at least mixer circuitry 1402, such as, for example, down-conversion mixer circuitry, amplifier circuitry 1406 and filter circuitry 1408. The transmit signal path of the radio IC circuitry 1206*a* may include at least filter circuitry 1412 and mixer circuitry 1414, such as, for example, up-conversion mixer circuitry. Radio IC circuitry 1206*a* may also include synthesizer circuitry 1404 for synthesizing a frequency 1405 for use by the mixer circuitry 1402 and the mixer circuitry 1414. The mixer circuitry 1402 and/or 1414 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 14 illustrates only a simplified version of a radio IC circuitry, and may include, although not shown, embodiments where each of the depicted circuitries may include more than one component. For instance, mixer circuitry 1414 may each include one or more mixers, and filter circuitries 1408 and/or 1412 may each include one or more filters, such as one or more BPFs and/or LPFs according to application needs. For example, when mixer circuitries are of the direct-conversion type, they may each include two or more mixers.

In some embodiments, mixer circuitry 1402 may be configured to down-convert RF signals 1407 received from the FEM circuitry 1204*a-b* (FIG. 12) based on the synthesized frequency 1405 provided by synthesizer circuitry 1404. The amplifier circuitry 1406 may be configured to amplify the down-converted signals and the filter circuitry 1408 may include an LPF configured to remove unwanted signals from the down-converted signals to generate output baseband signals 1407. Output baseband signals 1407 may be provided to the baseband processing circuitry 1208*a-b* (FIG. 12) for further processing. In some embodiments, the output baseband signals 1407 may be zero-frequency baseband signals, although this is not a requirement. In some embodiments, mixer circuitry 1402 may comprise passive mixers, although the scope of the embodiments is not limited in this respect.

In some embodiments, the mixer circuitry 1414 may be configured to up-convert input baseband signals 1411 based on the synthesized frequency 1105 provided by the synthesizer circuitry 1404 to generate RF output signals 1009 for the FEM circuitry 1204*a-b*. The baseband signals 1411 may be provided by the baseband processing circuitry 1208*a-b* and may be filtered by filter circuitry 1412. The filter circuitry 1412 may include an LPF or a BPF, although the scope of the embodiments is not limited in this respect.

In some embodiments, the mixer circuitry 1402 and the mixer circuitry 1414 may each include two or more mixers and may be arranged for quadrature down-conversion and/or up-conversion respectively with the help of synthesizer 1404. In some embodiments, the mixer circuitry 1402 and the mixer circuitry 1414 may each include two or more mixers each configured for image rejection (e.g., Hartley image rejection). In some embodiments, the mixer circuitry 1402 and the mixer circuitry 1414 may be arranged for direct down-conversion and/or direct up-conversion, respectively. In some embodiments, the mixer circuitry 1402 and the mixer circuitry 1414 may be configured for super-heterodyne operation, although this is not a requirement.

Mixer circuitry 1402 may comprise, according to one embodiment: quadrature passive mixers (e.g., for the in-phase (I) and quadrature phase (Q) paths). In such an embodiment, RF input signal 1007 from FIG. 14 may be down-converted to provide I and Q baseband output signals to be transmitted to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1405 of synthesizer 1404 (FIG. 14). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1307 (FIG. 13) may comprise a balanced signal, although the scope of the embodiments is not limited in this respect. The I and Q baseband output signals may be provided to low-noise amplifier, such as amplifier circuitry 1406 (FIG. 14) or to filter circuitry 1408 (FIG. 14).

In some embodiments, the output baseband signals 1407 and the input baseband signals 1411 may be analog baseband signals, although the scope of the embodiments is not limited in this respect. In some alternate embodiments, the output baseband signals 1407 and the input baseband signals 1411 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1404 may be a fractional-N synthesizer or a fractional N/N+1 synthesizer, although the scope of the embodiments is not limited in this respect as other types of frequency synthesizers may be suitable. For example, synthesizer circuitry 1404 may be a delta-sigma synthesizer, a frequency multiplier, or a synthesizer comprising a phase-locked loop with a frequency divider. According to some embodiments, the synthesizer circuitry 1404 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1404 may be provided by a voltage controlled oscillator (VCO), although that is not a requirement. A divider control input may further be provided by either the baseband processing circuitry 1208*a-b* (FIG. 12) depending on the desired output frequency 1405. In some embodiments, a divider control input (e.g., N) may be determined from a look-up table (e.g., within a Wi-Fi card) based on a channel number and a channel center frequency as determined or indicated by the example application processor 1210. The application processor 1210 may include, or otherwise be connected to, one of the example security signal converter or the example received signal converter (e.g., depending on which device the example radio architecture is implemented in).

In some embodiments, synthesizer circuitry 1404 may be configured to generate a carrier frequency as the output frequency 1405, while in other embodiments, the output frequency 1405 may be a fraction of the carrier frequency (e.g., one-half the carrier frequency, one-third the carrier frequency). In some embodiments, the output frequency 1405 may be a LO frequency (fLO).

Figure 15:
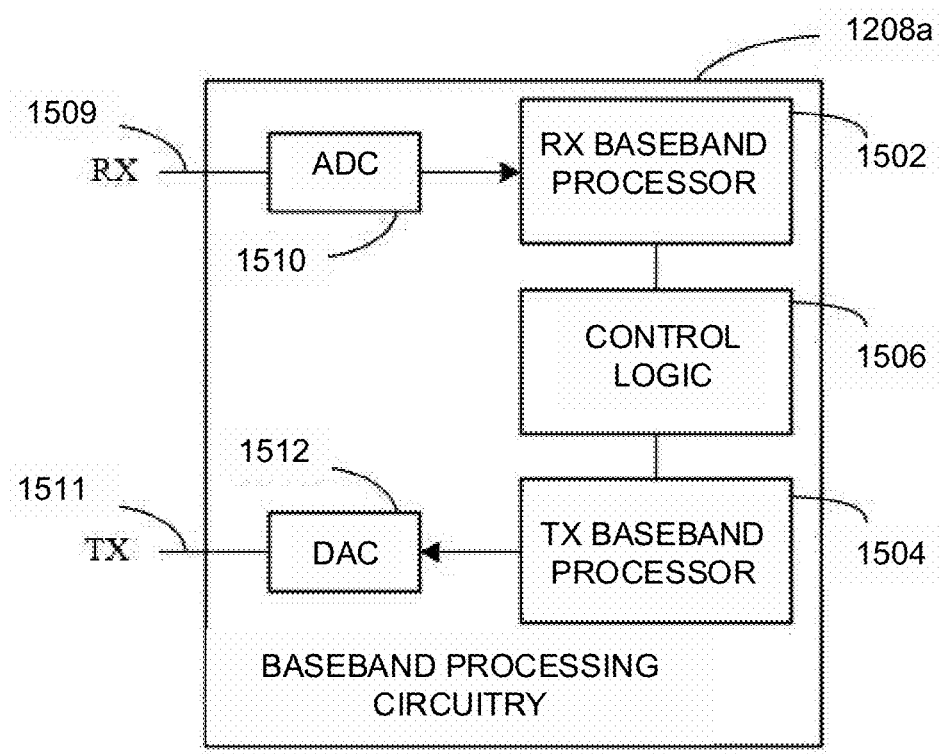
FIG. 15 illustrates a functional block diagram of baseband processing circuitry 1208*a* in accordance with some embodiments.

FIG. 15 illustrates a functional block diagram of baseband processing circuitry 1208*a* in accordance with some embodiments. The baseband processing circuitry 1208*a* is one example of circuitry that may be suitable for use as the baseband processing circuitry 1208*a* (FIG. 12), although other circuitry configurations may also be suitable. Alternatively, the example of FIG. 15 may be used to implement the example BT baseband processing circuitry 1208*b* of FIG. 12.

The baseband processing circuitry 1208*a* may include a receive baseband processor (RX BBP) 1502 for processing receive baseband signals 1509 provided by the radio IC circuitry 1206*a-b* (FIG. 12) and a transmit baseband processor (TX BBP) 1504 for generating transmit baseband signals 1511 for the radio IC circuitry 1206*a-b*. The baseband processing circuitry 1208*a* may also include control logic 1506 for coordinating the operations of the baseband processing circuitry 1208*a*.

In some embodiments (e.g., when analog baseband signals are exchanged between the baseband processing circuitry 1208*a-b* and the radio IC circuitry 1206*a-b*), the baseband processing circuitry 1208*a* may include ADC 1510 to convert analog baseband signals 1209 received from the radio IC circuitry 1206*a-b* to digital baseband signals for processing by the RX BBP 1502. In these embodiments, the baseband processing circuitry 1208*a* may also include DAC 1512 to convert digital baseband signals from the TX BBP 1504 to analog baseband signals 1511.

In some embodiments that communicate OFDM signals or OFDMA signals, such as through baseband processor 908*a*, the transmit baseband processor 1504 may be configured to generate OFDM or OFDMA signals as appropriate for transmission by performing an inverse fast Fourier transform (IFFT). The receive baseband processor 1502 may be configured to process received OFDM signals or OFDMA signals by performing an FFT. In some embodiments, the receive baseband processor 1502 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 12, in some embodiments, the antennas 1201 (FIG. 12) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1201 may each include a set of phased-array antennas, although embodiments are not so limited.

Although the radio architecture 1200A, 1200B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following paragraphs describe examples of various embodiments.

Example 1 includes a station (STA), comprising: a wireless medium; and processor circuitry coupled to the wireless medium and configured to: send a first quality of service (QoS) request message to an access point (AP) indicating a requested QoS for a traffic stream from the AP to the STA; and receive a first traffic stream applied with the requested QoS from the AP when the requested QoS matches with an existing QoS policy for the STA in the AP or there is no existing QoS policy for the STA in the AP.

Example 2 includes the STA of Example 1, wherein the processor circuitry is further configured to: receive a traffic stream applied with the existing QoS policy from the AP when the requested QoS does not match with the existing QoS policy for the STA in the AP; send a second QoS request message to the AP that indicates changing the requested QoS to match with the existing QoS policy; and receive a second traffic stream applied with the existing QoS policy from the AP.

Example 3 includes the STA of Example 1, wherein the processor circuitry is further configured to: send a second QoS request message to the AP indicating an updated requested QoS for a traffic stream from the AP to the STA; and receive a second traffic stream applied with the updated requested QoS from the AP when the AP accepts the updated requested QoS.

Example 4 includes the STA of any of Examples 1-3, wherein the existing QoS policy for the STA in the AP is created based on a previous QoS request message.

Example 5 includes the STA of any of Examples 1-4, wherein the STA may be a user device.

Example 6 includes the STA of any of Examples 1-5, wherein the AP may be a software enabled AP.

Example 7 includes the STA of any of Examples 1-6, wherein the STA and the AP are configured to communicate with each other via one or more wired communication networks and/or one or more wireless communication networks.

Example 8 includes an access point (AP), comprising: a wireless medium; and processor circuitry coupled to the wireless medium and configured to: receive a first quality of service (QoS) request message from a station (STA) indicating a requested QoS for a traffic stream from the AP to the STA; and send a first traffic stream applied with the requested QoS to the STA when the requested QoS matches with an existing QoS policy for the STA in the AP or there is no existing QoS policy for the STA in the AP.

Example 9 includes the AP of Example 8, wherein the processor circuitry is further configured to: send the first traffic stream applied with the existing QoS policy to the STA when the requested QoS does not match with the existing QoS policy for the STA in the AP; receive a second QoS request message form the STA that indicates changing the requested QoS to match with the existing QoS policy; and send a second traffic stream applied with the existing QoS policy to the STA.

Example 10 includes the AP of Example 8, wherein the processor circuitry is further configured to: receive a second QoS request message from the STA indicating an updated requested QoS for a traffic stream from the AP to the STA; and send a second traffic stream applied with the updated requested QoS to the STA when the AP accepts the updated requested QoS.

Example 11 includes the AP of any of Examples 8-10, wherein the existing QoS policy for the STA in the AP is created based on a previous QoS request message.

Example 12 includes a method, comprising: a station (STA) sending a first quality of service (QoS) request message to an access point (AP) indicating a requested QoS for a traffic stream from the AP to the STA; the AP receiving the first QoS request message from the STA and sending a first traffic stream applied with the requested QoS to the STA when the requested QoS matches with an existing QoS policy for the STA in the AP or there is no existing QoS policy for the STA in the AP, and the STA receiving the first traffic stream applied with the requested QoS from AP.

Example 13 includes the method of Example 12, further comprising: the AP sending the first traffic stream applied with the existing QoS policy to the STA when the requested QoS does not match with the existing QoS policy for the STA in the AP; the STA sending a second QoS request message to the AP that indicates changing the requested QoS to match with the existing QoS policy in response to receiving the first traffic stream applied with the existing QoS policy; the AP sending a second traffic stream applied with the existing QoS policy to the STA in response to receiving the second QoS request message that indicates changing the requested QoS to match with the existing QoS policy; and the STA receiving the second traffic stream applied with the existing QoS policy from the AP.

Example 14 includes the method of Example 12, further comprising: the STA sending a second QoS request message to the AP indicating an updated requested QoS for a traffic stream from the AP to the STA; the AP sending a second traffic stream applied with the updated requested QoS to the STA when the AP accepts the updated requested QoS; and the STA receiving the second traffic stream applied with the updated requested QoS from the AP.

Example 15 includes the method of any Examples 12-14, wherein the existing QoS policy for the STA in the AP is created based on a previous QoS request message.

Example 16 includes an access point (AP) comprising: a wireless medium; and processor circuitry coupled to the wireless medium and configured to: tentatively allocate network resources in the AP; send a quality of service (QoS) request message to a station (STA) that indicates a requested QoS for a traffic stream from the AP to the STA based on the tentatively allocated network resources; receive a response message from the STA that indicates the STA accepts or rejected the requested QoS; finalize the allocation of the network resources in the AP in response to receiving a response message from the STA that indicates the STA accepts the requested QoS; and send traffic streams applied with the requested QoS to the STA.

Example 17 includes the AP of Example 16, wherein the processor circuitry is further configured to: send an updated QoS request message to the STA that indicates an updated requested QoS for a traffic stream from the AP to the STA in response to a change in the requested QoS; receive a response message from the STA that indicates the STA accepts or refuses the updated requested QoS; and send the traffic streams applied with the updated requested QoS to the STA in response to receiving the response message from the STA that indicates the STA accepts the updated requested QoS.

Example 18 includes the AP of Example 16, wherein the processor circuitry is further configured to: receive an updated QoS request message from the STA that indicates an updated requested QoS for a traffic stream from the AP to the STA; send a response message to the STA that indicates the AP accepts or refuses the updated requested QoS, and send traffic streams applied with the updated requested QoS to the STAP when the AP accepts the updated requested QoS.

Example 19 includes the AP of any of Examples 16-18, wherein the AP tentatively allocate network resources based on current network conditions, policies and application priorities.

Example 20 includes the AP of any of Examples 16-19, wherein the STA accepts or refuses the requested QoS based on current network conditions, policies or application priorities.

Example 21 includes the AP of Example 17, wherein the STA accepts or refuses the updated requested QoS based on current network conditions, policies or application priorities.

Example 22 includes the AP of Example 18, wherein the AP accepts or refuses the updated requested QoS based on current network conditions, policies or application priorities.

Example 23 includes a station (STA) comprising: a wireless medium; and processor circuitry coupled to the wireless medium and configured to: receive a quality of service (QoS) request message from an access point (AP) that indicates a requested QoS for a traffic stream from the AP to the STA; send a response message to the AP that indicates the STA accepts or refuses the requested QoS; and receive traffic streams applied with the requested QoS from the AP when the STA accepts the requested QoS.

Example 24 includes the STA of Example 23, wherein the processor circuitry is further configured to: receive an updated QoS request message from the AP that indicates an updated requested QoS for a traffic stream from the AP to the STA; send a response message to the AP that indicates the STA accepts or refuses the updated requested QoS, and receive traffic streams applied with the updated requested QoS from the AP when the STA accepts the updated requested QoS.

Example 25 includes the STA of Example 23, wherein the processor circuitry is further configured to: send an updated QoS request message to the AP that indicates an updated requested QoS for a traffic stream from the AP to the STA in response to a change in the requested QoS; receive a response message from the AP that indicates the AP accepts or refuses the updated requested QoS; and receive the traffic streams applied with the updated requested QoS from the AP when the AP accepts the updated requested QoS.

Example 26 includes the STA of Example 23, wherein the STA accepts or refuses the requested QoS based on current network conditions, policies or application priorities.

Example 27 includes the STA of Example 24, wherein the STA accepts or refuses the updated requested QoS based on current network conditions, policies or application priorities.

Example 28 includes the STA of Example 25, wherein the AP accepts or refuses the updated requested QoS based on current network conditions, policies or application priorities.

Example 29 includes a method comprising: an access point (AP) tentatively allocating network resources in the AP; the AP sending a quality of service (QoS) request message to a station (STA) that indicates a requested QoS for a traffic stream from the AP to the STA based on the tentatively allocated network resources; the STA sending a response message to the AP that indicates the STA accepts or refuses the requested QoS in response to receiving the QoS request message from the AP; the AP finalizing the allocation of the network resources in the AP in response to receiving the response message from the STA that indicates the STA accepts the requested QoS, and sending traffic streams applied with the requested QoS to the STA; and the STA receiving traffic streams applied with the requested QoS from the AP.

Example 30 includes the method of Example 29, further comprising: the AP sending an updated QoS request message to the STA that indicates an updated requested QoS for a traffic stream from the AP to the STA in response to a change in the requested QoS; the STA sending a response message to the AP that indicates the STA accepts or refuses the updated requested QoS in response to receiving the updated QoS request message from the AP; the AP sending traffic streams applied with the updated requested QoS to the STA in response to receiving the updated response message from the STA that indicates the STA accepts the updated requested QoS; and the STA receiving the traffic streams applied with the updated requested QoS the AP.

Example 31 includes the method of Example 29, further comprising: the STA sending an updated QoS request message to the AP that indicates an updated requested QoS for a traffic stream from the AP to the STA in response to a change in the requested QoS; the AP sending a response message to the STA that indicates the AP accepts or refuses the updated requested QoS in response to receiving the updated QoS request message from the STA; the AP sending traffic streams applied with the updated requested QoS when the AP accepts the updated requested QoS; and the STA receiving the traffic streams applied with the updated requested QoS from the AP.

Example 32 includes the method of Example 29, wherein the AP tentatively allocate network resources based on current network conditions, policies and application priorities.

Example 33 includes the method of Example 29, wherein the STA accepts or refuses the requested QoS based on current network conditions, policies or application priorities.

Example 34 includes the method of Example 30, wherein the STA accepts or refuses the updated requested QoS based on current network conditions, policies or application priorities.

Example 35 includes the method of Example 31, wherein the AP accepts or refuses the updated requested QoS based on current network conditions, policies or application priorities.

Example 36 includes a computer readable medium with instructions stored thereon, when executed by a processor, cause a station (STA) to: send a first quality of service (QoS) request message to an access point (AP) indicating a requested QoS for a traffic stream from the AP to the STA; and receive a first traffic stream applied with the requested QoS from the AP when the requested QoS matches with an existing QoS policy for the STA in the AP or there is no existing QoS policy for the STA in the AP.

Example 37 includes the computer readable medium of Example 36, wherein the instructions, when executed by a processor, further cause the STA to: receive a traffic stream applied with the existing QoS policy from the AP when the requested QoS does not match with the existing QoS policy for the STA in the AP; send a second QoS request message to the AP that indicates changing the requested QoS to match with the existing QoS policy; and receive a second traffic stream applied with the existing QoS policy from the AP.

Example 38 includes the computer readable medium of Example 36, wherein the instructions, when executed by a processor, further cause the STA to: send a second QoS request message to the AP indicating an updated requested QoS for a traffic stream from the AP to the STA; and receive a second traffic stream applied with the updated requested QoS from the AP when the AP accepts the updated requested QoS.

Example 39 includes the computer readable medium of any of Examples 36-38, wherein the existing QoS policy for the STA in the AP is created based on a previous QoS request message.

Example 40 includes the computer readable medium of any of Examples 36-39, wherein the STA may be a user device.

Example 41 includes the computer readable medium of any of Examples 36-40, wherein the AP may be a software enabled AP.

Example 42 includes the computer readable medium of any of Examples 36-41, wherein the STA and the AP are configured to communicate with each other via one or more wired communication networks and/or one or more wireless communication networks.

Example 43 includes a computer readable medium with instructions stored thereon, when executed by a processor, cause an access point (AP) to: receive a first quality of service (QoS) request message from a station (STA) indicating a requested QoS for a traffic stream from the AP to the STA; and send a first traffic stream applied with the requested QoS to the STA when the requested QoS matches with an existing QoS policy for the STA in the AP or there is no existing QoS policy for the STA in the AP.

Example 44 includes the computer readable medium of Example 43, wherein the instructions, when executed by a processor, further cause the AP to: send the first traffic stream applied with the existing QoS policy to the STA when the requested QoS does not match with the existing QoS policy for the STA in the AP; receive a second QoS request message form the STA that indicates changing the requested QoS to match with the existing QoS policy; and send a second traffic stream applied with the existing QoS policy to the STA.

Example 45 includes the computer readable medium of Example 43, wherein the instructions, when executed by a processor, further cause the AP to: receive a second QoS request message from the STA indicating an updated requested QoS for a traffic stream from the AP to the STA; and send a second traffic stream applied with the updated requested QoS to the STA when the AP accepts the updated requested QoS.

Example 46 includes the computer readable medium of any of Examples 43-45, wherein the existing QoS policy for the STA in the AP is created based on a previous QoS request message.

Example 47 includes a computer readable medium with instructions stored thereon, when executed by a processor, cause an access point (AP) to: tentatively allocate network resources in the AP; send a quality of service (QoS) request message to a station (STA) that indicates a requested QoS for a traffic stream from the AP to the STA based on the tentatively allocated network resources; receive a response message from the STA that indicates the STA accepts or rejected the requested QoS; finalize the allocation of the network resources in the AP in response to receiving a response message from the STA that indicates the STA accepts the requested QoS; and send traffic streams applied with the requested QoS to the STA.

Example 48 includes the computer readable medium of Example 47, wherein the instructions, when executed by a processor, further cause the AP to: send an updated QoS request message to the STA that indicates an updated requested QoS for a traffic stream from the AP to the STA in response to a change in the requested QoS; receive a response message from the STA that indicates the STA accepts or refuses the updated requested QoS; and send the traffic streams applied with the updated requested QoS to the STA in response to receiving the response message from the STA that indicates the STA accepts the updated requested QoS.

Example 49 includes the computer readable medium of Example 47, wherein the instructions, when executed by a processor, further cause the AP to: receive an updated QoS request message from the STA that indicates an updated requested QoS for a traffic stream from the AP to the STA; send a response message to the STA that indicates the AP accepts or refuses the updated requested QoS, and send traffic streams applied with the updated requested QoS to the STAP when the AP accepts the updated requested QoS.

Example 50 includes the computer readable medium of any of Examples 47-49, wherein the AP tentatively allocate network resources based on current network conditions, policies and application priorities.

Example 51 includes the computer readable medium of any of Examples 47-50, wherein the STA accepts or refuses the requested QoS based on current network conditions, policies or application priorities.

Example 52 includes the computer readable medium of Example 48, wherein the STA accepts or refuses the updated requested QoS based on current network conditions, policies or application priorities.

Example 53 includes the computer readable medium of Example 49, wherein the AP accepts or refuses the updated requested QoS based on current network conditions, policies or application priorities.

Example 54 includes a computer readable medium with instructions stored thereon, when executed by a processor, cause a station (STA) to: receive a quality of service (QoS) request message from an access point (AP) that indicates a requested QoS for a traffic stream from the AP to the STA; send a response message to the AP that indicates the STA accepts or refuses the requested QoS; and receive traffic streams applied with the requested QoS from the AP when the STA accepts the requested QoS.

Example 55 includes the computer readable medium of Example 54, wherein the instructions, when executed by a processor, further cause the STA to: receive an updated QoS request message from the AP that indicates an updated requested QoS for a traffic stream from the AP to the STA; send a response message to the AP that indicates the STA accepts or refuses the updated requested QoS, and receive traffic streams applied with the updated requested QoS from the AP when the STA accepts the updated requested QoS.

Example 56 includes the computer readable medium of Example 54, wherein the instructions, when executed by a processor, further cause the STA to: send an updated QoS request message to the AP that indicates an updated requested QoS for a traffic stream from the AP to the STA in response to a change in the requested QoS; receive a response message from the AP that indicates the AP accepts or refuses the updated requested QoS; and receive the traffic streams applied with the updated requested QoS from the AP when the AP accepts the updated requested QoS.

Example 57 includes the computer readable medium of Example 54, wherein the STA accepts or refuses the requested QoS based on current network conditions, policies or application priorities.

Example 58 includes the computer readable medium of Example 55, wherein the STA accepts or refuses the updated requested QoS based on current network conditions, policies or application priorities.

Example 59 includes the computer readable medium of Example 56, wherein the AP accepts or refuses the updated requested QoS based on current network conditions, policies or application priorities.

Example 60 includes a computer readable medium with instructions stored thereon, when executed by a processor, implement the method of any of Examples 12-15.

Example 61 includes a computer readable medium with instructions stored thereon, when executed by a processor, implement the method of any of Examples 29-35.

Although certain embodiments have been illustrated and described herein for purposes of description, a wide variety of alternate and/or equivalent embodiments or implementations calculated to achieve the same purposes may be substituted for the embodiments shown and described without departing from the scope of the disclosure. This application is intended to cover any adaptations or variations of the embodiments discussed herein. Therefore, it is manifestly intended that embodiments described herein be limited only by the appended claims and the equivalents thereof.

What is claimed is:

1. An access point (AP) comprising:
a wireless medium; and
processor circuitry coupled to the wireless medium and configured to:
tentatively allocate network resources in the AP;
send a quality of service (QOS) request message to a station (STA) that indicates a requested QOS for a traffic stream from the AP to the STA based on the tentatively allocated network resources;
receive a response message from the STA that indicates the STA accepts or rejected the requested QOS;
finalize the allocation of the network resources in the AP in response to receiving a response message from the STA that indicates the STA accepts the requested QOS; and
send traffic streams applied with the requested QoS to the STA.

2. The AP of claim 1, wherein the processor circuitry is further configured to:
send an updated QoS request message to the STA that indicates an updated requested QoS for a traffic stream from the AP to the STA in response to a change in the requested QOS;
receive a response message from the STA that indicates the STA accepts or refuses the updated requested QOS; and
send the traffic streams applied with the updated requested QOS to the STA in response to receiving the response message from the STA that indicates the STA accepts the updated requested QoS.

3. The AP of claim 2, wherein the STA accepts or refuses the updated requested QoS based on current network conditions, policies or application priorities.

4. The AP of claim 1, wherein the processor circuitry is further configured to:
receive an updated QOS request message from the STA that indicates an updated requested QOS for a traffic stream from the AP to the STA;
send a response message to the STA that indicates the AP accepts or refuses the updated requested QoS, and
send traffic streams applied with the updated requested QOS to the STAP when the AP accepts the updated requested QoS.

5. The AP of claim 4, wherein the AP accepts or refuses the updated requested QoS based on current network conditions, policies or application priorities.

6. The AP of claim 1, wherein the AP tentatively allocate network resources based on current network conditions, policies and application priorities.

7. The AP of claim 1, wherein the STA accepts or refuses the requested QoS based on current network conditions, policies or application priorities.

8. A method comprising:
an access point (AP) tentatively allocating network resources in the AP;
the AP sending a quality of service (QOS) request message to a station (STA) that indicates a requested QoS for a traffic stream from the AP to the STA based on the tentatively allocated network resources;
the STA sending a response message to the AP that indicates the STA accepts or refuses the requested QoS in response to receiving the QoS request message from the AP;
the AP finalizing the allocation of the network resources in the AP in response to receiving the response message from the STA that indicates the STA accepts the requested QoS, and sending traffic streams applied with the requested QOS to the STA; and the STA receiving traffic streams applied with the requested QOS from the AP.

9. The method of claim 8, further comprising:

the AP sending an updated QOS request message to the STA that indicates an updated requested QoS for a traffic stream from the AP to the STA in response to a change in the requested QoS;

the STA sending a response message to the AP that indicates the STA accepts or refuses the updated requested QoS in response to receiving the updated QoS request message from the AP;

the AP sending traffic streams applied with the updated requested QoS to the STA in response to receiving the updated response message from the STA that indicates the STA accepts the updated requested QoS; and the STA receiving the traffic streams applied with the updated requested QOS the AP.

10. The method of claim 9, wherein the STA accepts or refuses the updated requested QoS based on current network conditions, policies or application priorities.

11. The method of claim 8, further comprising:

the STA sending an updated QoS request message to the AP that indicates an updated requested QoS for a traffic stream from the AP to the STA in response to a change in the requested QOS;

the AP sending a response message to the STA that indicates the AP accepts or refuses the updated requested QoS in response to receiving the updated QoS request message from the STA;

the AP sending traffic streams applied with the updated requested QoS when the AP accepts the updated requested QOS; and the STA receiving the traffic streams applied with the updated requested QOS from the AP.

12. The method of claim 11, wherein the AP accepts or refuses the updated requested QoS based on current network conditions, policies or application priorities.

13. The method of claim 8, wherein the AP tentatively allocate network resources based on current network conditions, policies and application priorities.

14. The method of claim 8, wherein the STA accepts or refuses the requested QoS based on current network conditions, policies or application priorities.

15. A non-transitory computer readable medium with instructions stored thereon, when executed by a processor, cause an access point (AP) to:

tentatively allocate network resources in the AP; send a quality of service (QOS) request message to a station (STA) that indicates a requested QoS for a traffic stream from the AP to the STA based on the tentatively allocated network resources;

receive a response message from the STA that indicates the STA accepts or rejected the requested QOS;

finalize the allocation of the network resources in the AP in response to receiving a response message from the STA that indicates the STA accepts the requested QOS; and send traffic streams applied with the requested QoS to the STA.

16. The non-transitory computer readable medium of claim 15, wherein the instructions, when executed by a processor, further cause the AP to:

send an updated QoS request message to the STA that indicates an updated requested QoS for a traffic stream from the AP to the STA in response to a change in the requested QOS;

receive a response message from the STA that indicates the STA accepts or refuses the updated requested QOS; and send the traffic streams applied with the updated requested QoS to the STA in response to receiving the response message from the STA that indicates the STA accepts the updated requested QoS.

17. The non-transitory computer readable medium of claim 16, wherein the STA accepts or refuses the updated requested QoS based on current network conditions, policies or application priorities.

18. The non-transitory computer readable medium of claim 15, wherein the instructions, when executed by a processor, further cause the AP to:

receive an updated QOS request message from the STA that indicates an updated requested QoS for a traffic stream from the AP to the STA;

send a response message to the STA that indicates the AP accepts or refuses the updated requested QoS, and send traffic streams applied with the updated requested QoS to the STAP when the AP accepts the updated requested QoS.

19. The non-transitory computer readable medium of claim 15, wherein the AP tentatively allocate network resources based on current network conditions, policies and application priorities.

20. The non-transitory computer readable medium of claim 15, wherein the STA accepts or refuses the requested QoS based on current network conditions, policies or application priorities.

* * * * *